United States Patent
Inoue et al.

(10) Patent No.: US 10,895,208 B2
(45) Date of Patent: Jan. 19, 2021

(54) CONTROL SYSTEM FOR COMPRESSION-IGNITION ENGINE

(71) Applicant: Mazda Motor Corporation, Hiroshima (JP)

(72) Inventors: Atsushi Inoue, Aki-gun (JP); Masanari Sueoka, Hiroshima (JP); Kota Matsumoto, Aki-gun (JP); Keiji Maruyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 88 days.

(21) Appl. No.: 16/055,908

(22) Filed: Aug. 6, 2018

(65) Prior Publication Data
US 2019/0063350 A1    Feb. 28, 2019

(30) Foreign Application Priority Data

Aug. 24, 2017 (JP) ................................ 2017-161559
Aug. 24, 2017 (JP) ................................ 2017-161560

(51) Int. Cl.
*F02D 41/00*    (2006.01)
*F02D 41/30*    (2006.01)
(Continued)

(52) U.S. Cl.
CPC ....... *F02D 41/0052* (2013.01); *F02D 35/025* (2013.01); *F02D 41/0002* (2013.01);
(Continued)

(58) Field of Classification Search
CPC ............. F02D 17/02; F02D 2200/0414; F02D 35/025; F02D 41/0002; F02D 41/0052;
(Continued)

(56) References Cited

U.S. PATENT DOCUMENTS 4,765,294 A * 8/1988 Katsumoto ............. F02B 31/06
                                                     123/188.14
5,884,598 A * 3/1999 Kawashima ............ F02B 31/02
                                                     123/188.8

(Continued)

FOREIGN PATENT DOCUMENTS

JP    2003049691 A    2/2003
JP    2003106184 A    4/2003
(Continued)

*Primary Examiner* — John M Zaleskas
(74) *Attorney, Agent, or Firm* — Alleman Hall Creasman & Tuttle LLP

(57) ABSTRACT

A control system for a compression-ignition engine is provided, which includes an engine configured to combust a mixture gas inside a combustion chamber by compression ignition, a fuel injector attached to the engine, a state function adjusting part attached to the engine and configured to adjust at least introduction of fresh air into the combustion chamber, a three-way catalyst provided in an exhaust passage of the engine, a wall temperature acquiring part configured to acquire a parameter related to a temperature of a wall of the combustion chamber, and a controller. A swirl flow is generated inside the combustion chamber to circle along the wall. When the wall temperature of the combustion chamber is below a given wall temperature, the controller sets an air-fuel ratio of the mixture gas substantially to a stoichiometric air-fuel ratio so as to remain within a purification window of the three-way catalyst.

7 Claims, 12 Drawing Sheets

(51) Int. Cl.
*F02D 41/40* (2006.01)
*F02B 3/06* (2006.01)
*F02D 35/02* (2006.01)
*F02B 23/06* (2006.01)
*F02M 26/05* (2016.01)
*F02M 26/26* (2016.01)

(52) U.S. Cl.
CPC ..... *F02D 41/3029* (2013.01); *F02D 41/3041* (2013.01); *F02D 41/3064* (2013.01); *F02D 41/401* (2013.01); *F02B 3/06* (2013.01); *F02B 23/0624* (2013.01); *F02D 2041/0015* (2013.01); *F02D 2200/0414* (2013.01); *F02M 26/05* (2016.02); *F02M 26/26* (2016.02)

(58) Field of Classification Search
CPC ............. F02D 41/3029; F02D 41/3035; F02D 41/3041; F02D 41/3047; F02D 41/3064; F02D 2041/0015; F02B 1/12
See application file for complete search history.

(56) References Cited

U.S. PATENT DOCUMENTS

| | | | | |
|---|---|---|---|---|
| 6,161,530 | A * | 12/2000 | Kakizaki | F02D 41/0042 123/674 |
| 6,293,246 | B1 * | 9/2001 | Tanahashi | F01L 1/34 123/305 |
| 6,336,436 | B1 * | 1/2002 | Miyakubo | F02B 1/12 123/295 |
| 7,168,420 | B1 * | 1/2007 | Yang | F02D 41/003 123/295 |
| 10,502,147 | B2 * | 12/2019 | Inoue | F02D 13/0265 |
| 2001/0045200 | A1 * | 11/2001 | Urushihara | F02B 1/12 123/295 |
| 2002/0059914 | A1 * | 5/2002 | Yamaguchi | F02D 37/02 123/299 |
| 2002/0073957 | A1 * | 6/2002 | Urushihara | F02D 35/023 123/299 |
| 2003/0061803 | A1 * | 4/2003 | Iihoshi | F02B 1/12 60/285 |
| 2004/0060527 | A1 * | 4/2004 | Hitomi | F02D 9/04 123/58.8 |
| 2005/0016496 | A1 * | 1/2005 | Hitomi | F01L 1/053 123/305 |
| 2005/0022755 | A1 * | 2/2005 | Hitomi | F01L 1/185 123/58.8 |
| 2005/0229908 | A1 * | 10/2005 | Kuzuyama | F02D 35/025 123/552 |
| 2007/0062483 | A1 * | 3/2007 | Yang | F02D 35/025 123/295 |
| 2007/0062484 | A1 * | 3/2007 | Yang | F02D 35/028 123/295 |
| 2007/0062486 | A1 * | 3/2007 | Yang | F02B 11/00 123/305 |
| 2007/0157604 | A1 * | 7/2007 | Kakuya | F02D 13/0246 60/285 |
| 2007/0227503 | A1 * | 10/2007 | Hitomi | F02D 13/0223 123/406.45 |
| 2008/0035125 | A1 * | 2/2008 | Jankovic | F02D 13/0234 123/556 |
| 2008/0178836 | A1 * | 7/2008 | Yamashita | F02B 17/00 123/295 |
| 2009/0259387 | A1 * | 10/2009 | Kakuya | F02D 13/0265 701/103 |
| 2009/0320788 | A1 * | 12/2009 | Ohtsubo | F02B 1/14 123/295 |
| 2010/0012079 | A1 * | 1/2010 | Nakazono | F02D 41/0002 123/295 |
| 2011/0180039 | A1 * | 7/2011 | Nada | F02D 35/02 123/445 |
| 2012/0055445 | A1 * | 3/2012 | Kakuya | F02D 41/3035 123/305 |
| 2012/0216774 | A1 * | 8/2012 | Oba | F02M 41/00 123/305 |
| 2012/0216775 | A1 * | 8/2012 | Iwai | F02D 41/0057 123/305 |
| 2012/0216776 | A1 * | 8/2012 | Nagatsu | F02B 23/101 123/305 |
| 2013/0047958 | A1 * | 2/2013 | Yamakawa | F02D 13/0219 123/406.44 |
| 2014/0251252 | A1 * | 9/2014 | Wasada | F02M 31/042 123/184.21 |
| 2015/0083072 | A1 * | 3/2015 | Nagatsu | F02D 41/0057 123/27 R |
| 2015/0083073 | A1 * | 3/2015 | Nagatsu | F02D 41/3035 123/294 |
| 2015/0114342 | A1 * | 4/2015 | Iwai | F02M 26/25 123/305 |
| 2015/0226143 | A1 * | 8/2015 | Iwai | F02D 13/0207 123/294 |
| 2016/0252031 | A1 * | 9/2016 | Nagatsu | F02D 41/0057 123/305 |
| 2016/0265482 | A1 * | 9/2016 | Nagatsu | F02D 41/0057 |
| 2017/0234249 | A1 * | 8/2017 | Sakai | F02D 41/0025 123/295 |
| 2017/0276082 | A1 * | 9/2017 | Hotta | F02F 3/22 |
| 2017/0292462 | A1 * | 10/2017 | Tsuda | F02B 11/00 |
| 2018/0334989 | A1 * | 11/2018 | Inoue | F02D 41/0065 |
| 2019/0063363 | A1 * | 2/2019 | Ogata | F02D 41/14 |
| 2019/0145338 | A1 * | 5/2019 | Tanaka | F02D 41/3064 60/285 |

FOREIGN PATENT DOCUMENTS

| | | |
|---|---|---|
| JP | 2012246783 A | 12/2012 |
| JP | 201344289 A | 3/2013 |
| JP | 2013044289 A | 3/2013 |
| WO | 2009091077 A1 | 7/2009 |

* cited by examiner

CONTROL SYSTEM FOR COMPRESSION-IGNITION ENGINE

TECHNICAL FIELD

The present disclosure relates to a control system of a compression-ignition engine.

BACKGROUND OF THE DISCLOSURE

JP2013-044289A discloses a diesel engine which performs a pre-mixture compression-ignition combustion. When an outdoor air temperature or an intake air temperature decreases, the engine increases an amount of intake air into a combustion chamber to have a lean air-fuel ratio of a mixture gas. Thus, an oxidation reaction between a fuel and the air when pre-mixing them is stimulated and a desired heat generation rate waveform is obtained.

While the art described in JP2013-044289A is targeted to a diesel engine which uses diesel fuel and adjusts the air-fuel ratio of the mixture gas according to the outdoor air temperature or the intake air temperature, based on the present inventors' study, it was found that the control based only on the outdoor air temperature or the intake air temperature may fail to stabilize combustion by compression ignition. Meanwhile, there is an approach for an engine which uses the fuel at least containing gasoline, to cause the mixture gas to combust by compression ignition. However, in such an engine, if a temperature inside the combustion chamber before the compression starts varies, the timing of the self-ignition greatly changes.

SUMMARY OF THE DISCLOSURE

The present disclosure is directed to stably performing combustion by compression ignition in a compression-ignition engine.

The present inventors considered a combustion mode in which SI (Spark Ignition) combustion and CI (Compression Ignition) combustion are combined. The SI combustion is a combustion accompanying flame propagation which starts by forcibly igniting the mixture gas inside a combustion chamber. The CI combustion is a combustion which starts by the mixture gas inside the combustion chamber self-igniting by being compressed. In the combustion mode combining the SI combustion and the CI combustion, the mixture gas inside the combustion chamber is forcibly ignited to start its combustion through flame propagation, and heat generated by this SI combustion and pressure increase thereby cause combustion of unburned mixture gas inside the combustion chamber by compression ignition. Hereinafter, this combustion mode is referred to as "SPCCI (SPark Controlled Compression Ignition) combustion.

In the combustion caused by compression ignition, the timing of the compression ignition changes greatly if the temperature inside the combustion chamber varies before the compression starts. In this regard, the variation in the temperature inside the combustion chamber before the compression starts can be reduced by adjusting the heat generation amount in the SI combustion. For example, by controlling the ignition timing to adjust the start timing of the SI combustion according to the temperature inside the combustion chamber before the compression starts, the timing of compression ignition can be controlled. The SPCCI combustion controls the CI combustion with the SI combustion.

Since the SI combustion by flame propagation causes a relatively small pressure increase compared to the CI combustion, it is possible in SPCCI combustion to thus reduce combustion noise. Further, the CI combustion shortens the combustion period compared to the SI combustion, which is advantageous for SPCCI combustion in improving fuel efficiency. Moreover, since the SPCCI combustion including the CI combustion ensures combustion stability even with a lean air-fuel ratio of the mixture gas, fuel efficiency of the engine is improved more while maintaining exhaust emission performance.

Although in SPCCI combustion, the combustion by compression ignition is stably performed, based on the present inventors' study, it was found that the combustion by compression ignition becomes unstable if the temperature of the intake air introduced into the combustion chamber is low. Therefore, the exhaust emission performance may degrade.

Therefore, the present inventors configured an engine which performs SPCCI combustion such that, when combustion by compression ignition is not stable due to a low temperature of an intake air introduced into a combustion chamber, exhaust gas is purified using a three-way catalyst by setting an air-fuel ratio of the mixture gas to or substantially to a stoichiometric air-fuel ratio.

According to one aspect of the present disclosure, a control system for a compression-ignition engine is provided. The device includes an engine configured to combust a mixture gas inside a combustion chamber by compression ignition, a fuel injector attached to the engine, a state function adjusting part attached to the engine and configured to adjust at least an introduction of fresh air into the combustion chamber, a three-way catalyst provided in an exhaust passage of the engine, a wall temperature acquiring part configured to acquire a parameter related to a temperature of a wall of the combustion chamber, and a controller connected to the fuel injector, the state function adjusting part, and the wall temperature acquiring part and configured to receive a detection signal from the wall temperature acquiring part and output a control signal to the fuel injector and the state function adjusting part, respectively.

A swirl flow is generated inside the combustion chamber to circle along the wall. When the wall temperature of the combustion chamber is below a given wall temperature, the controller sets an air-fuel ratio of the mixture gas substantially to a stoichiometric air-fuel ratio so as to remain within a purification window of the three-way catalyst.

Here, the "engine" may be a four-stroke engine which is operated by a combustion chamber repeating intake stroke, compression stroke, expansion stroke and exhaust stroke. The "substantial stoichiometric air-fuel ratio" includes the stoichiometric air-fuel ratio and air-fuel ratios near the stoichiometric air-fuel ratio. The air-fuel ratios near the stoichiometric air-fuel ratio are defined within the purification window of the three-way catalyst. Further, the "state function adjusting part" is not limited to a throttle valve disposed in an intake passage. For example, a valve timing and/or valve lift of an intake valve is controlled to adjust an introduction amount of fresh air. Alternatively, the state function adjusting part may adjust the introduction amount of fresh air by controlling an introduction amount of exhaust gas recirculation (EGR) gas into the combustion chamber.

Inside the combustion chamber of the engine, the swirl flow is generated to circle along the wall thereof. This swirl flow is strong in an outer circumferential portion of the combustion chamber which is near the wall surface, and is weak in the center portion which is away from the wall surface.

The engine combusts the mixture gas inside the combustion chamber by the compression ignition. Although the mixture gas ignites by compression when pressure and/or temperature inside the combustion chamber reaches a given value, since the swirl flow is strong in the outer circumferential portion, heat exchange efficiency between the mixture gas and the wall surface is improved. When the wall temperature is low, the temperature of the outer circumferential portion is likely to be lower than the center portion, which may cause a difficulty in the mixture gas in the outer circumferential portion igniting by compression. As a result, exhaust emission performance of the engine may degrade.

With the above configuration, based on the parameter related to the wall temperature of the combustion chamber acquired by the wall temperature acquiring part, when the wall temperature of the combustion chamber is below the given wall temperature, the air-fuel ratio of the mixture gas is set substantially to the stoichiometric air-fuel ratio so as to remain within the purification window of the three-way catalyst. The exhaust gas discharged from the combustion chamber is purified by the three-way catalyst disposed in the exhaust passage. Thus, it is prevented that the exhaust emission performance degrades when the wall temperature of the combustion chamber is low.

When the wall temperature of the combustion chamber is above the given wall temperature, the controller may set the air-fuel ratio of the mixture gas to be leaner than the stoichiometric air-fuel ratio.

When the wall temperature of the combustion chamber is above the given wall temperature, the mixture gas inside the combustion chamber suitably combusts by the compression ignition. Even when the air-fuel ratio of the mixture gas is set leaner than the stoichiometric air-fuel ratio, the exhaust emission performance of the combustion by the compression ignition does not degrade and fuel efficiency of the engine improves.

When an engine load is at or below a given load and the wall temperature of the combustion chamber is below the given wall temperature, the controller may set the air-fuel ratio of the mixture gas substantially to the stoichiometric air-fuel ratio, and when the engine load is at or below the given load and the wall temperature of the combustion chamber is at or above the given wall temperature, the controller may set the air-fuel ratio of the mixture gas leaner than the stoichiometric air-fuel ratio.

Setting the air-fuel ratio of the mixture gas to be leaner than the stoichiometric air-fuel ratio when the engine load is low is further advantageous in improving the fuel efficiency of the engine. When the engine load is low and the wall temperature of the combustion chamber is below the given wall temperature, by setting the air-fuel ratio of the mixture gas substantially to the stoichiometric air-fuel ratio, the degradation of the exhaust emission performance is prevented.

The state function adjusting part may adjust the introduction of the fresh air and the EGR gas into the combustion chamber. When the wall temperature of the combustion chamber is below the given wall temperature, the controller may set the air-fuel ratio of the mixture gas substantially to the stoichiometric air-fuel ratio, and may introduce the EGR gas into the combustion chamber.

By introducing the EGR gas into the combustion chamber to dilute the mixture gas, the fuel efficiency of the engine improves. That is, by setting the air-fuel ratio of the mixture gas substantially to the stoichiometric air-fuel ratio and introducing the EGR gas into the combustion chamber, both the improvement of the fuel efficiency and the maintenance of the exhaust emission performance are achieved.

The controller may set a gas-fuel ratio (G/F) as an index relating to a mass ratio between all gas and fuel inside the combustion chamber, to 18 or above. Based on the knowledge of the present inventors, setting the G/F to 18 or above prevents combustion noise from exceeding an allowable value. Note that based on the knowledge of the present inventors, the G/F of the mixture gas may be set to 50 or lower.

The control system may further include an ignitor disposed to be oriented into the combustion chamber. The controller may control the ignitor to ignite the mixture gas at a given timing so that the ignited mixture gas starts propagating flame along the wall of the combustion chamber by the swirl flow and then unburned mixture gas is compressed to ignite at the given timing.

With this configuration, the swirl flow is generated inside the combustion chamber, and when the mixture gas ignites, the flame propagates along the wall of the combustion chamber by the swirl flow. When the wall temperature of the combustion chamber is low, the SI combustion in the SPCCI combustion is cooled by the wall surface and the timing of the compression ignition is delayed. If unburned mixture gas is to be compressed to ignite at a target timing, for example, it is required to increase heat generation amount by the SI combustion in the SPCCI combustion by increasing the fuel amount. However, if the fuel amount is increased, the exhaust emission performance may degrade.

Thus, in the case where the SPCCI combustion is performed, when the wall temperature is below the given wall temperature, the air-fuel ratio of the mixture gas is set substantially to the stoichiometric air-fuel ratio. The exhaust gas discharged from the combustion chamber is purified by the three-way catalyst, and thus, the degradation of the exhaust emission performance is prevented.

Further, when the wall temperature is above the given wall temperature, even if the air-fuel ratio of the mixture gas is set leaner than the stoichiometric air-fuel ratio, the combustion stability of the SPCCI combustion is secured and the exhaust emission performance does not degrade and the fuel efficiency of the engine improves.

The control system may further include a swirl generating part configured to generate the swirl flow inside the combustion chamber. The controller may control the swirl generating part to adjust a state inside the combustion chamber at an ignition timing to have a swirl ratio of 2 or above.

By generating the strong swirl flow inside the combustion chamber, the SI combustion is sufficiently performed until the CI combustion starts in the SPCCI combustion. As a result, the generation of combustion noise is reduced and, since the combustion temperature does not become excessively high, generation of $NO_x$ is also reduced. Further, the compression ignition of the unburned mixture gas is performed at the target timing, thus the stability of the SPCCI combustion improves, which reduces a variation in torque between combustion cycles.

According to another aspect of the present disclosure, a control system for a compression-ignition engine is provided, which includes an engine configured to combust a mixture gas inside a combustion chamber by compression ignition, a fuel injector attached to the engine, a state function adjusting part attached to the engine and configured to adjust at least introduction of fresh air into the combustion chamber, an ignitor disposed to be oriented into the combustion chamber, a three-way catalyst provided in an exhaust passage of the engine, an intake air temperature acquiring part configured to acquire a parameter related to a temperature of intake air introduced into the combustion chamber, and a controller connected to the fuel injector, the state function adjusting part, the ignitor, and the intake air temperature acquiring part and configured to receive a detection signal from the intake air temperature acquiring part and output a control signal to the fuel injector, the state function adjusting part, and the ignitor, respectively.

The controller controls the ignitor to ignite the mixture gas at a given timing so that the ignited mixture gas starts combustion by flame propagation and then unburned mixture gas is compressed to ignite at the given timing. When the temperature of the intake air is below a given intake air temperature, the controller sets an air-fuel ratio of the mixture gas substantially to a stoichiometric air-fuel ratio so as to remain within a purification window of the three-way catalyst.

The controller controls the ignitor to ignite at the given timing. After the ignited mixture gas starts the combustion by flame propagation, the unburned mixture gas is compressed to ignite at the given timing. By adjusting the ignition timing according to the temperature inside the combustion chamber before the compression starts, the CI combustion is performed while preventing combustion noise. Further, fuel efficiency of the engine improves.

When the intake air temperature is below the given intake air temperature, the CI combustion does not stabilize and the exhaust emission performance may degrade. Therefore, when the intake air temperature is below the given intake air temperature, the controller sets the air-fuel ratio of the mixture gas to or substantially to the stoichiometric air-fuel ratio so as to remain within the purification window of the three-way catalyst. Thus, the exhaust gas discharged from the combustion chamber is purified using the three-way catalyst disposed in the exhaust passage. As a result, it is prevented that the exhaust emission performance degrades when the wall temperature of the combustion chamber is low.

The state function adjusting part may adjust the introduction of the fresh air and the EGR gas into the combustion chamber. When the intake air temperature of the combustion chamber is below the given intake air temperature, the controller may set the air-fuel ratio of the mixture gas substantially to the stoichiometric air-fuel ratio, and introduce the EGR gas into the combustion chamber.

By introducing the EGR gas into the combustion chamber to dilute the mixture gas, fuel efficiency of the engine improves. That is, by setting the air-fuel ratio of the mixture gas substantially to the stoichiometric air-fuel ratio and introducing the EGR gas into the combustion chamber, both the improvement of the fuel efficiency and the maintenance of the exhaust emission performance are achieved.

The controller may set G/F as an index relating to a mass ratio between all gas and fuel inside the combustion chamber, to 18 or above. Based on the knowledge of the present inventors, setting the air-fuel ratio of the mixture gas substantially to the stoichiometric air-fuel ratio and setting the G/F to 18 or above prevent combustion noise in the compression ignition from exceeding an allowable value. Note that the G/F of the mixture gas may be set to 50 or lower. Based on the knowledge of the present inventors, the SPCCI combustion is stably performed if the G/F of the mixture gas is 50 or lower.

When the temperature of the intake air is at or above the given intake air temperature, the controller may set the air-fuel ratio of the mixture gas leaner than the stoichiometric air-fuel ratio.

When the intake air temperature is at or above the given intake air temperature, even if the air-fuel ratio of the mixture gas is set leaner than the stoichiometric air-fuel ratio, the combustion stability of the CI combustion in the SPCCI combustion is secured, and the exhaust emission performance does not degrade, rather it improves the fuel efficiency of the engine.

When an engine load is at or below a given load and the intake air temperature is below the given intake air temperature, the controller may set the air-fuel ratio of the mixture gas substantially to the stoichiometric air-fuel ratio, and when the engine load is at or below the given load and the intake air temperature is at or above the given wall temperature, the controller may set the air-fuel ratio of the mixture gas leaner than the stoichiometric air-fuel ratio.

Setting the air-fuel ratio of the mixture gas to be leaner than the stoichiometric air-fuel ratio when the engine load is low is further advantageous in improving the fuel efficiency of the engine. When the engine load is low and the intake air temperature is below the given intake air temperature, by setting the air-fuel ratio of the mixture gas substantially to the stoichiometric air-fuel ratio, the degradation of the exhaust emission performance in the SPCCI combustion is prevented.

The control system may further include a swirl generating part configured to generate a swirl flow inside the combustion chamber. The swirl flow may be generated inside the combustion chamber to circle along the wall. The controller may control the ignitor to ignite the mixture gas at the given timing so that the ignited mixture gas starts propagating flame along the wall of the combustion chamber by the swirl flow and then unburned mixture gas is compressed to ignite at the given timing.

This swirl flow is strong in an outer circumferential portion of the combustion chamber which is near the wall surface, and is weak in the center portion which is away from the wall surface. The flame of the SPCCI combustion moves along the swirl flow and propagates in the outer circumferential portion of the combustion chamber along the wall thereof. Then, the unburned mixture gas is compressed to ignite at the given timing and the CI combustion is performed in the outer circumferential portion and the center portion of the combustion chamber. By generating the swirl flow inside the combustion chamber in the SPCCI combustion, the SI combustion is sufficiently performed until the CI combustion starts. As a result, the generation of combustion noise is reduced and, since the combustion temperature does not become excessively high, generation of $NO_x$ is also reduced. Further, the compression ignition of the unburned mixture gas is performed at the target timing, thus the stability of the SPCCI combustion improves, which reduces a variation in torque between combustion cycles.

The controller may control the swirl generating part to adjust a state inside the combustion chamber at the given timing to have a swirl ratio of 2 or above.

By generating the strong swirl flow, the reduction of combustion noise, the reduction of the $NO_x$, and the reduction of the variation in torque described above are achieved more reliably.

The control system may further include a wall temperature acquiring part configured to acquire a parameter related to a temperature of a wall of the combustion chamber. When the wall temperature of the combustion chamber is below the given wall temperature or the intake air temperature is below the given intake air temperature, the controller may set the air-fuel ratio of the mixture gas substantially to the stoichiometric air-fuel ratio so as to remain within the purification window of the three-way catalyst.

The combustion by compression ignition in the SPCCI combustion is also difficult to stabilize when the wall temperature of the combustion chamber is low. Further as described above, with the configuration in which the swirl flow is generated inside the combustion chamber and the flame of the SPCCI combustion propagates along the wall of the combustion chamber in this state, when the wall temperature of the combustion chamber is low, the SI combustion is cooled by the wall surface, and therefore the timing of the compression ignition is delayed. If the unburned mixture gas is to be compressed to ignite at the target timing, for example, it is required to increase the heat generation amount in the SI combustion of the SPCCI combustion by, for example, increasing the fuel amount. However, if the fuel amount is increased, the exhaust emission performance may degrade.

Thus, in the case of performing the SPCCI combustion, when the wall temperature is below the given wall temperature or the intake air temperature is below the intake air temperature, by setting the air-fuel ratio of the mixture gas substantially to the stoichiometric air-fuel ratio, the exhaust gas is purified by the three-way catalyst, and thus, the degradation of the exhaust emission performance is prevented.

According to another aspect of the present disclosure, a control system for a compression-ignition engine is provided, which includes an engine having a combustion chamber formed by a cylinder, a piston and a cylinder head, a fuel injection valve attached to the engine, a spark plug disposed to be oriented into the combustion chamber and configured to perform ignition, an air-fuel ratio controller configured to adjust an air-fuel ratio of mixture gas inside the combustion chamber, a three-way catalyst provided in an exhaust passage of the engine, a temperature sensor configured to detect a parameter related to a temperature of the combustion chamber, and a controller connected to the fuel injection valve, the air-fuel ratio controller, the spark plug, and the temperature sensor and configured to output a control signal to the air-fuel ratio controller upon reception of a detection signal from the temperature sensor. The controller includes a processor configured to execute a temperature determining module configured to determine whether the temperature of the combustion chamber is at or above a given temperature based on an output value of the temperature sensor, an air-fuel ratio controlling module configured, when the temperature of the combustion chamber is determined to be below the given temperature at an engine load, to output a control signal to the air-fuel ratio controller to set the air-fuel ratio of the mixture gas substantially to the stoichiometric air-fuel ratio and, when the temperature of the combustion chamber is determined to be above the given temperature at the engine load, to output a control signal to the air-fuel ratio controller to set the air-fuel ratio of the mixture gas leaner than a stoichiometric air-fuel ratio, and a spark plug controlling module configured to output a control signal to the spark plug to perform the ignition at a given ignition timing so that the mixture gas starts combustion by flame propagation and then unburned mixture gas self-ignites, the given ignition timing being stored in an ignition timing memory.

The parameter related to the temperature of the combustion chamber may be a combustion-chamber-wall-temperature related value. The controller may have a first operating range map defining flame propagation combustion in which self-ignition does not occur from a lowest load to a highest load of the engine, a second operating range map defining self-ignition combustion in which the air-fuel ratio is substantially at the stoichiometric air-fuel ratio from the lowest load to the highest load of the engine, and a third operating range map defining self-ignition combustion in which the air-fuel ratio is leaner than the stoichiometric air-fuel ratio from the lowest load to a given high load of the engine, and self-ignition combustion in which the air-fuel ratio is substantially at the stoichiometric air-fuel ratio from the given high load to the highest load of the engine. The controller may further include an operating range map selecting module configured to select the first operating range map when the combustion-chamber-wall-temperature related value is below a first low wall temperature, the second operating range map when the combustion-chamber-wall-temperature related value is at or above the first low wall temperature and below a second wall temperature higher than the first low wall temperature, and the third operating range map when the combustion-chamber-wall-temperature related value is at or above the second wall temperature.

The parameter related to the temperature of the combustion chamber may be an intake-air-temperature related value. The controller may have a first operating range map defining a flame propagation combustion in which self-ignition does not occur from a lowest load to a highest load of the engine, a second operating range map defining self-ignition combustion in which the air-fuel ratio is substantially at the stoichiometric air-fuel ratio from the lowest load to the highest load of the engine, and a third operating range map defining self-ignition combustion in which the air-fuel ratio is leaner than the stoichiometric air-fuel ratio from the lowest load to a given high load of the engine, and self-ignition combustion in which the air-fuel ratio is substantially at the stoichiometric air-fuel ratio from the given high load to the highest load of the engine. The controller may further include an operating range map selecting module configured to select the first operating range map when the intake-air-temperature related value is below a first low intake air temperature, the second operating range map when the intake-air-temperature related value is at or above the first low intake air temperature and below a second intake air temperature higher than the first low intake air temperature, and the third operating range map when the intake-air-temperature related value is at or above the second intake air temperature.

The spark plug may be disposed at a position of a ceiling surface of the combustion chamber, away from a center axis of the cylinder of the engine.

DETAILED DESCRIPTION OF THE DISCLOSURE

Figure 1:
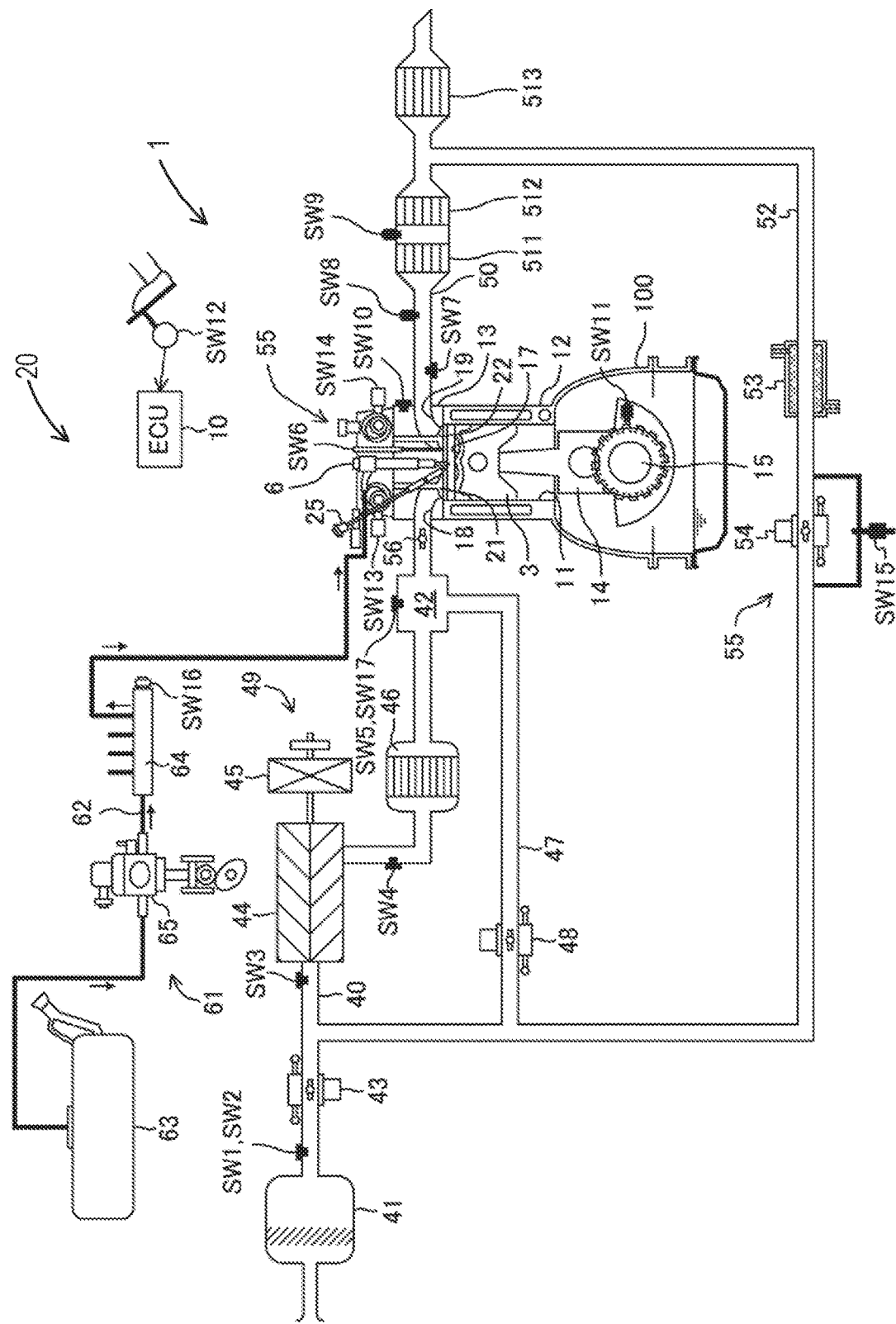
FIG. 1 is a diagram illustrating a configuration of an engine.
Figure 2:
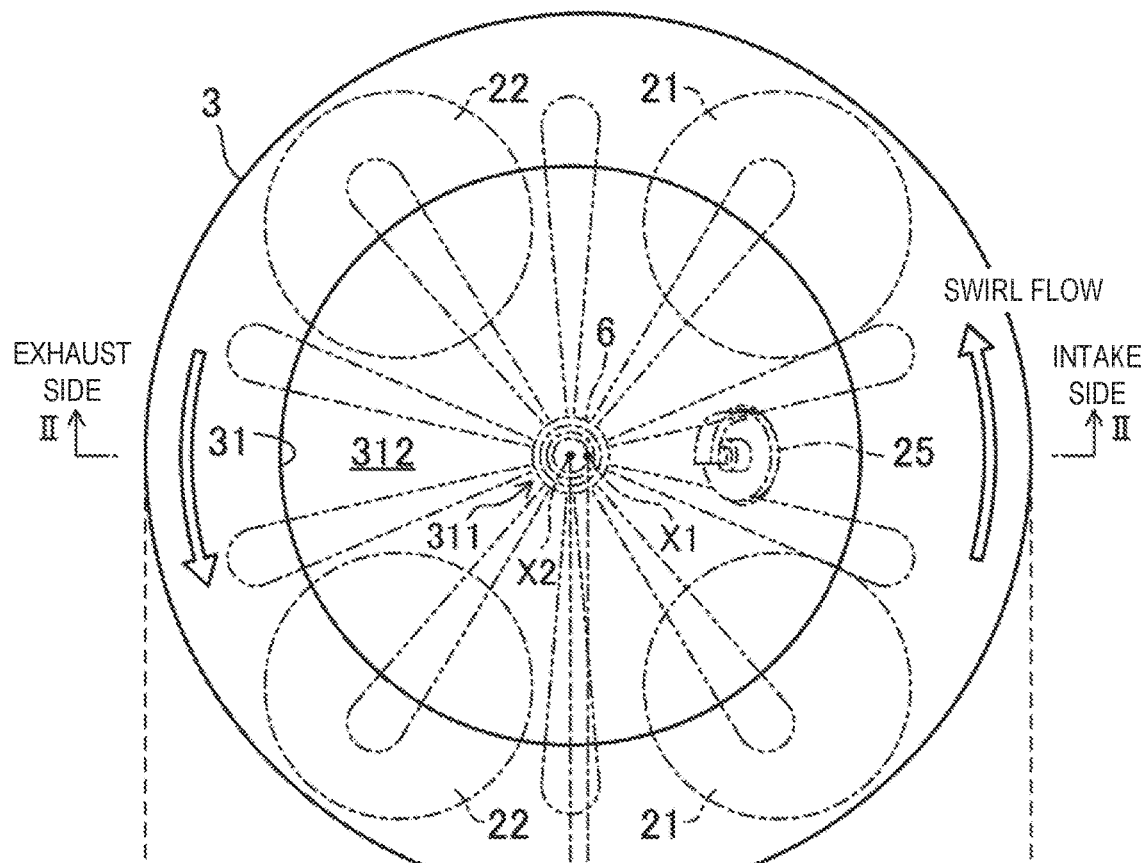
FIG. 2 is a diagram illustrating a structure of a combustion chamber, in which the upper part is a plan view of the combustion chamber and the lower part is a II-II cross-sectional view.
Figure 2:
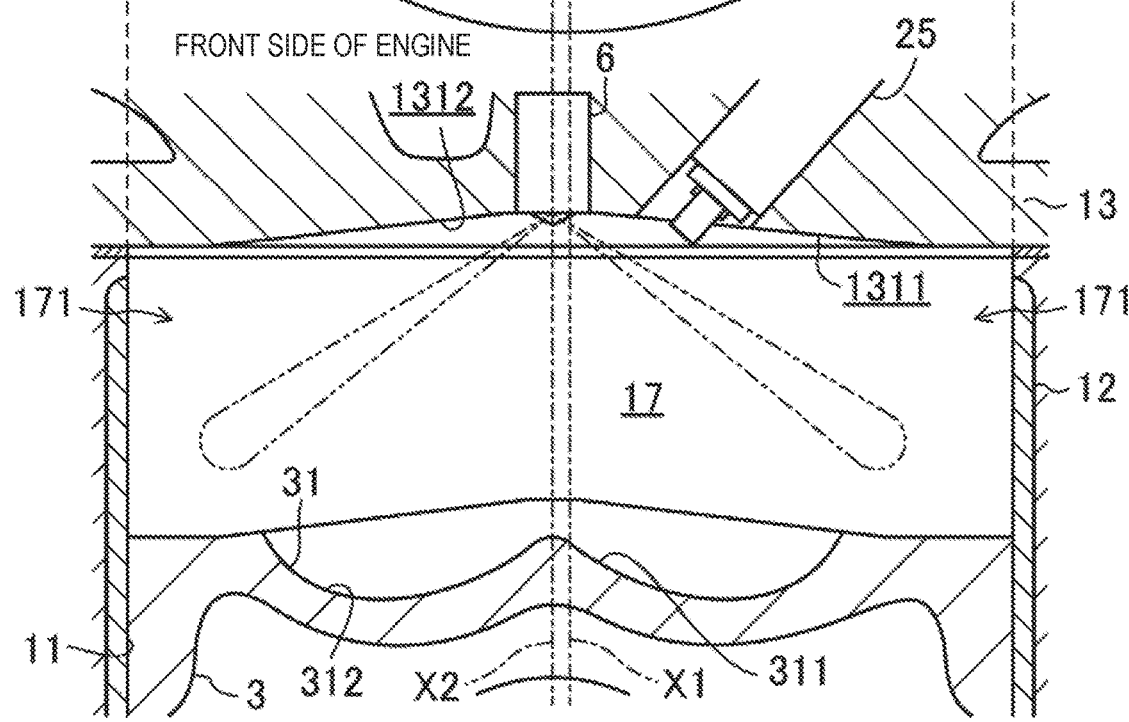
Figure 3:
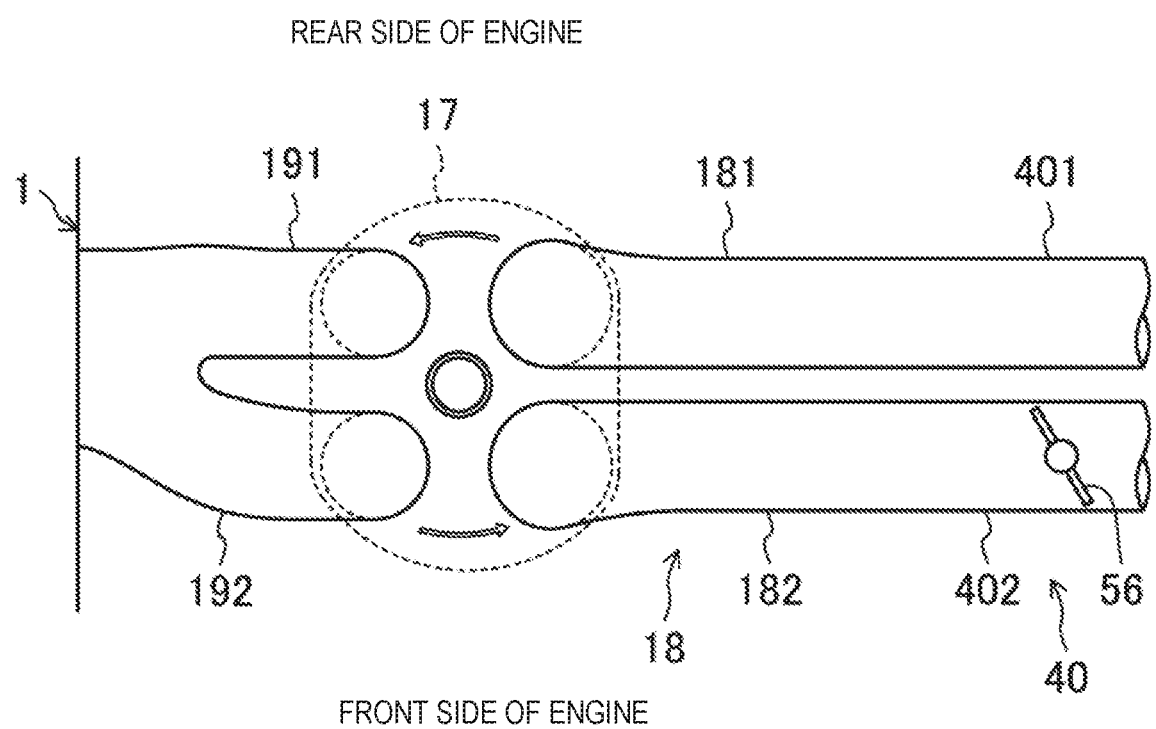
FIG. 3 is a plan view illustrating structures of the combustion chamber and an intake system.
Figure 4:
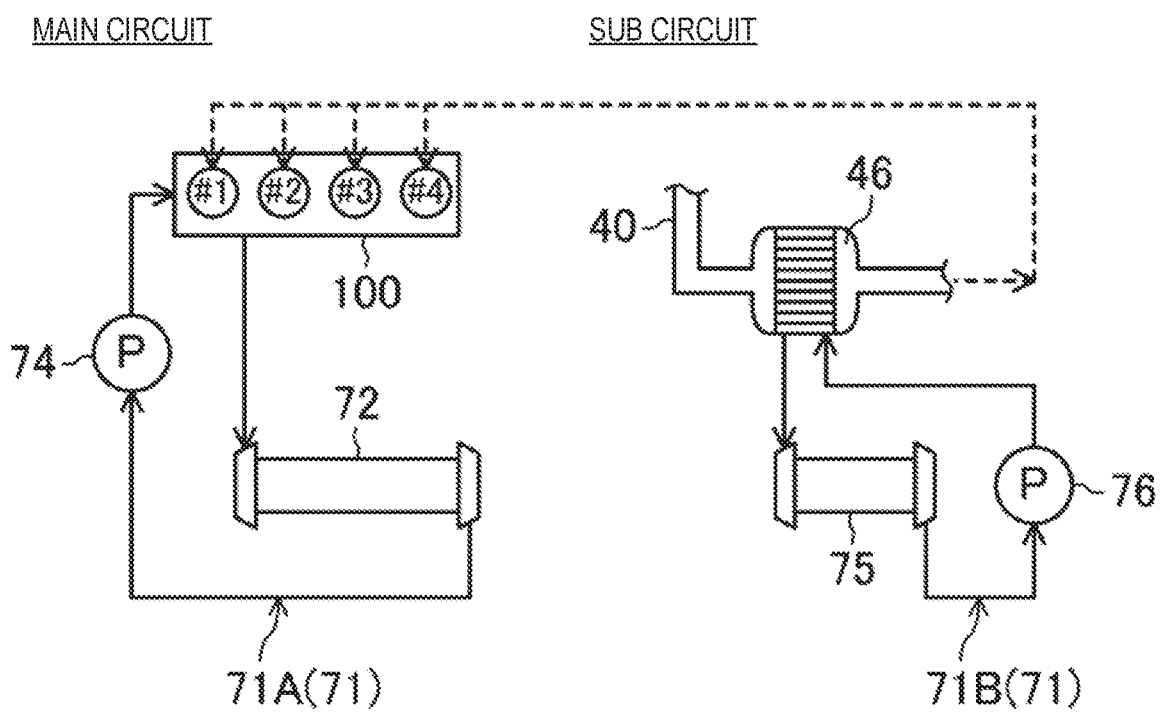
FIG. 4 shows diagrams of a cooling device of the engine, in which a left part is a configuration of a main circuit and a right part is a configuration of a sub circuit.
Figure 5:
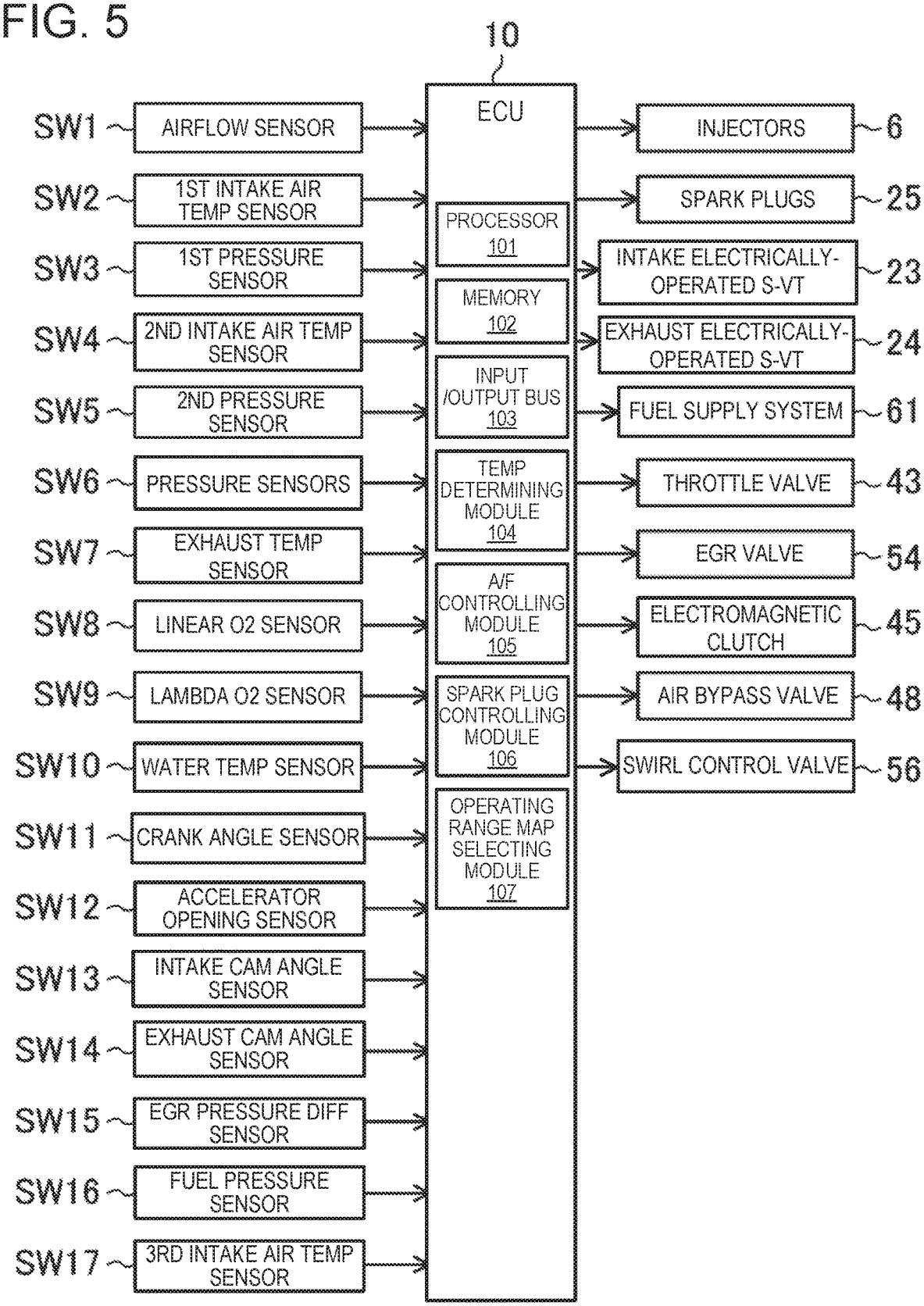
FIG. 5 is a block diagram illustrating a configuration of a control device for the engine.

Hereinafter, one embodiment of a compression-ignition engine is described in detail with reference to the accompanying drawings. The following description gives one example of an engine. FIG. 1 is a diagram illustrating a configuration of an engine 1. FIG. 2 is a plan view illustrating a structure of a combustion chamber. FIG. 3 is a plan view illustrating structures of the combustion chamber and an intake system. Note that in FIG. 1, an intake side is on the left side and an exhaust side is on the right side of the drawing sheet. Further in FIGS. 2 and 3, the intake side is on the right side and the exhaust side is on the left side of the drawing sheets. FIG. 4 shows views illustrating a configuration of a cooling device of the engine. FIG. 5 is a block diagram illustrating a configuration of a control device for the engine.

The engine 1 is a four-stroke engine which is operated by a combustion chamber 17 repeating intake stroke, compression stroke, expansion stroke, and exhaust stroke. The engine 1 is mounted on a four-wheel automobile. The automobile travels by the operation of the engine 1. Fuel of the engine 1 is gasoline in this embodiment. The gasoline may contain bioethanol, etc. The fuel of the engine 1 may be any kind of fuel as long as it is liquid fuel containing at least gasoline.

(Engine Configuration)

The engine 1 includes a cylinder block 12 and a cylinder head 13 placed on the cylinder block 12. The cylinder block 12 is formed therein with a plurality of cylinders 11. In FIGS. 1 and 2, only one cylinder 11 is illustrated. The engine 1 is a multi-cylinder engine.

A piston 3 is reciprocatably inserted in each cylinder 11. The piston 3 is coupled to a crankshaft 15 via a connecting rod 14. The piston 3 defines the combustion chamber 17 together with the cylinder 11 and the cylinder head 13. Note that the definition of "combustion chamber" is not limited to a space formed when the piston 3 is at a top dead center on compression stroke (CTDC) but may be broad. That is, "combustion chamber" may mean any space formed by the piston 3, the cylinder 11, and the cylinder head 13 regardless of the position of the piston 3.

As illustrated in the lower part of FIG. 2, a lower surface of the cylinder head 13, that is, a ceiling surface of the combustion chamber 17, is formed by an inclined surface 1311 and an inclined surface 1312. The inclined surface 1311 inclines upwardly toward an injection axis X2 (an axis passing through the center of injection of an injector 6 described later) from the intake side. The inclined surface 1312 inclines upwardly toward the injection axis X2 from the exhaust side. The ceiling surface of the combustion chamber 17 has a so-called pent-roof shape.

An upper surface of the piston 3 bulges toward the ceiling surface of the combustion chamber 17. The piston 3 is dented in its upper surface to form a cavity 31. The cavity 31 is arranged opposing to an injector 6 described later.

The center of the cavity 31 is offset from a center axis X1 of the cylinder 11 to the exhaust side, and coincides with the injection axis X2 of the injector 6. The cavity 31 has a convex section 311. The convex section 311 is formed on the injection axis X2 of the injector 6. The convex section 311 has a substantially conical shape. The convex section 311 extends upwardly toward the ceiling surface of the combustion chamber 17 from the bottom of the cavity 31.

The cavity 31 has a dented section 312 formed to surround the convex section 311 entirely. The cavity 31 has a symmetric shape with respect to the injection axis X2.

A circumferential side face of the dented section 312 extends from the bottom surface of the cavity 31 to the opening surface of the cavity 31, inclined with respect to the injection axis X2 (i.e., constituting the circumferential side face of the cavity 31). An inner diameter of the cavity 31 at the dented section 312 gradually increases from the bottom surface of the cavity 31 to the opening surface of the cavity 31.

The geometric compression ratio of the engine 1 is set to be between 13 and 30. As described later, within some of operating ranges of the engine 1, the engine 1 performs an SPCCI combustion in which SI combustion and CI combustion are combined. The SPCCI combustion controls the CI combustion by utilizing the heat generated by the SI combustion and the pressure increase. In this engine 1, it is unnecessary to raise the temperature of the combustion chamber 17 when the piston 3 reaches CTDC for the mixture gas to self-ignite (i.e., the compression end temperature). That is, although the engine 1 performs the CI combustion, its geometric compression ratio may be set relatively low. Reducing the geometric compression ratio is advantageous in reducing a cooling loss and a mechanical loss. For example, the geometric compression ratio of the engine 1 may be set to 14:1 to 17:1 in regular specifications (the octane number of the fuel is about 91) and to 15:1 to 18:1 in high-octane specifications (the octane number of the fuel is about 96).

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine 1. The intake port 18 communicates with the combustion chamber 17. Although not illustrated in detail, the intake port 18 is a so-called tumble port. That is, the intake port 18 has such a shape that a tumble flow is formed in the combustion chamber 17.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve mechanism which makes a valve timing and/or valve lift variable. In this configuration example, as illustrated in FIG. 5, the variable valve mechanism has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the intake valve operating mechanism may have a hydraulically-operated S-VT instead of the electrically-operated S-VT.

The cylinder head 13 is also formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine 1. The exhaust port 19 communicates with the combustion chamber 17.

An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve mechanism which makes a valve timing and/or valve lift variable. In this configuration example, as illustrated in FIG. 5, the variable valve mechanism has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the exhaust valve operating mechanism may have a hydraulically-operated S-VT instead of the electrically-operated S-VT.

The engine 1 adjusts the length of an overlap period of an open timing of the intake valve 21 and a close timing of the exhaust valve 22 by the intake electrically-operated S-VT 23 and the exhaust electrically-operated S-VT 24. Thus, residual gas in the combustion chamber 17 is scavenged. Further, by adjusting the length of the overlap period, internal EGR gas is introduced into the combustion chamber 17 or is confined in the combustion chamber 17. In this configuration example, the intake electrically-operated S-VT 23 and the exhaust electrically-operated S-VT 24 constitute an internal exhaust gas recirculation (EGR) system. Note that the internal EGR system is not necessarily constituted by the S-VT. Further, the intake electrically-operated S-VT 23 and the exhaust electrically-operated S-VT 24 are respectively one of state function adjusting parts which adjust the introduction of fresh air and the EGR gas into the combustion chamber 17.

The injector 6 is attached to the cylinder head 13 for each cylinder 11. The injector 6 injects the fuel directly into the combustion chamber 17. The injector 6 is disposed in a valley portion of the pent roof where the inclined surface 1311 on the intake side and the inclined surface 1312 on the exhaust side intersect. As illustrated in FIG. 2, the injector 6 is disposed so that its injection axis X2 is located on the exhaust side of the center axis X1. The injection axis X2 of the injector 6 is parallel to the center axis X1. The injection axis X2 of the injector 6 coincides with the position of the convex section 311 of the cavity 31 as described above. The injector 6 is oriented toward the cavity 31. Note that the injection axis X2 of the injector 6 may coincide with the center axis X1 of the cylinder 11. Also in this case, it is desirable that the injection axis X2 of the injector 6 coincides with the position of the convex section 311 of the cavity 31.

Although is not illustrated in detail, the injector 6 is constructed by a multi-port fuel injection valve having a plurality of nozzle ports. As indicated by two-dotted chain lines in FIG. 2, the injector 6 injects the fuel so that the fuel spray radially spreads from the radial center of the combustion chamber 17. In this configuration example, the injector 6 has ten nozzle ports, and the nozzle ports are arranged at an even angular interval in the circumferential direction. As illustrated in the upper part of FIG. 2, the axes of the nozzle ports do not circumferentially overlap with a spark plug 25 described later. That is, the spark plug 25 is sandwiched between the axes of two adjacent nozzle ports. Thus, the fuel spray injected from the injector 6 is prevented from directly hitting the spark plug 25 and wetting an electrode.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this embodiment, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the nozzle ports of the injector 6. The fuel supply system 61 is configured to supply the fuel at a high pressure of 30 MPa or higher to the injector 6. A highest fuel pressure of the fuel supply system 61 may be, for example, about 120 MPa. The pressure of the fuel supplied to the injector 6 may be changed according to an operating state of the engine 1. Note that the structure of the fuel supply system 61 is not limited to the above structure.

The spark plug 25 is attached to the cylinder head 13 for each cylinder 11. The spark plug 25 forcibly ignites the mixture gas in the combustion chamber 17. In this configuration example, the spark plug 25 is disposed at the intake side of the cylinder 11 with respect to the center axis X1. The spark plug 25 is located between the two intake ports 18. The spark plug 25 is attached to the cylinder head 13 to extend downwardly, toward the center of the combustion chamber 17 in a tilted posture with respect to up-and-down directions of the cylinder head 13. As illustrated in FIG. 2, the electrode of the spark plug 25 is located near the ceiling surface of the combustion chamber 17 to be oriented toward inside the combustion chamber 17. Note that the spark plug 25 may be disposed on the exhaust side of the center axis X1 of the cylinder 11. Alternatively, the spark plug 25 may be disposed on the center axis X1 of the cylinder 11, and the injector 6 may be disposed on the intake side or the exhaust side with respect to the center axis X1. In other embodiments, the spark plug 25 may be disposed at a position of the ceiling surface of the combustion chamber 17 away from the center axis X1 of the cylinder 11 of the engine 1.

An intake passage 40 is connected to one side of the engine 1. The intake passage 40 communicates with the intake ports 18 of the cylinders 11. The intake passage 40 is a passage through which gas to be introduced into the combustion chamber 17 flows. An air cleaner 41 which filters fresh air is disposed in an upstream end part of the intake passage 40. A surge tank 42 is disposed near a downstream end of the intake passage 40. A part of the intake passage 40 downstream of the surge tank 42 forms independent passages branching for the respective cylinders 11. Downstream ends of the independent passages communicate with the intake ports 18 of the cylinders 11, respectively.

A throttle valve 43 (air-fuel ratio controller) is disposed in the intake passage 40 between the air cleaner 41 and the surge tank 42. The throttle valve 43 adjusts an introduction amount of fresh air into the combustion chamber 17 by adjusting an opening thereof. The throttle valve 43 constitutes one of the state function adjusting parts.

A booster 44 is disposed in the intake passage 40 downstream of the throttle valve 43. The booster 44 boosts the gas introduced into the combustion chamber 17. In this configuration example, the booster 44 is a supercharger which is driven by the engine 1. The booster 44 may be, for example, of a Lisholm type. The booster 44 may have any structure, for example, of a Roots type, a Vane type, or a centrifugal type.

An electromagnetic clutch 45 is interposed between the booster 44 and the engine 1. The electromagnetic clutch 45 controls the flow of a driving force between the booster 44 and the engine 1, for example, it transmits the driving force from the engine 1 to the booster 44 or interrupts the transmission of the driving force therebetween. As is described later, by an ECU 10 (Engine Controller) switching the connection/disconnection of the electromagnetic clutch 45, the booster 44 is switched on or off. In this engine 1, boosting the gas to be introduced into the combustion chamber 17 by the booster 44 and not boosting the same by the booster 44 are switchable therebetween.

An intercooler 46 is disposed in the intake passage 40 downstream of the booster 44. The intercooler 46 cools the gas compressed in the booster 44. The intercooler 46 may be, for example, of a water cooling type. The intercooler 46 may be, for example, of a hydraulically cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. For example, the bypass passage 47 is connected to the surge tank 42. An air bypass valve 48 is disposed in the bypass passage 47. The air bypass valve 48 adjusts a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), the gas passed through the booster 44 partially flows back upstream of the booster 44 through the bypass passage 47. By controlling an opening of the air bypass valve 48, the backflow amount is adjusted, which leads to adjusting the boosting pressure of the gas introduced into the combustion chamber 17. Note that the term "boosted" may be defined as when the pressure in the surge tank 42 exceeds atmospheric pressure, and the term "non-boosted" may be defined as when the pressure in the surge tank 42 falls below the atmospheric pressure.

In this configuration example, a boosting system 49 is comprised of the booster 44, the bypass passage 47, and the air bypass valve 48. The boosting system 49 constitutes one of the state function adjusting parts.

The engine 1 has a swirl generating part which generates a swirl flow inside the combustion chamber 17. As illustrated in FIG. 3, the swirl generating part is a swirl control valve (SCV) 56 attached to the intake passage 40. The SCV 56 is disposed in a passage. The passage is one of a primary passage 401 and a secondary passage 402 communicating with the first intake port 181 and the second intake port 182, respectively. The SCV 56 is an opening regulating valve which is configured to adjust an opening of a cross section of the secondary passage 402. When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow inside the combustion chamber 17 becomes strong. When the opening of the SCV 56 is large, the flow rates of the intake air into the combustion chamber 17 from the first intake port 181 and the second intake port 182 become substantially even, and thus the swirl flow inside the combustion chamber 17 becomes weak. When the SCV 56 is fully opened, a swirl flow does not occur. Note that the swirl flow circulates in the counter-clockwise direction in FIG. 3 as indicated by the white outlined arrows (also see the white outlined arrows in FIG. 2).

Figure 6:
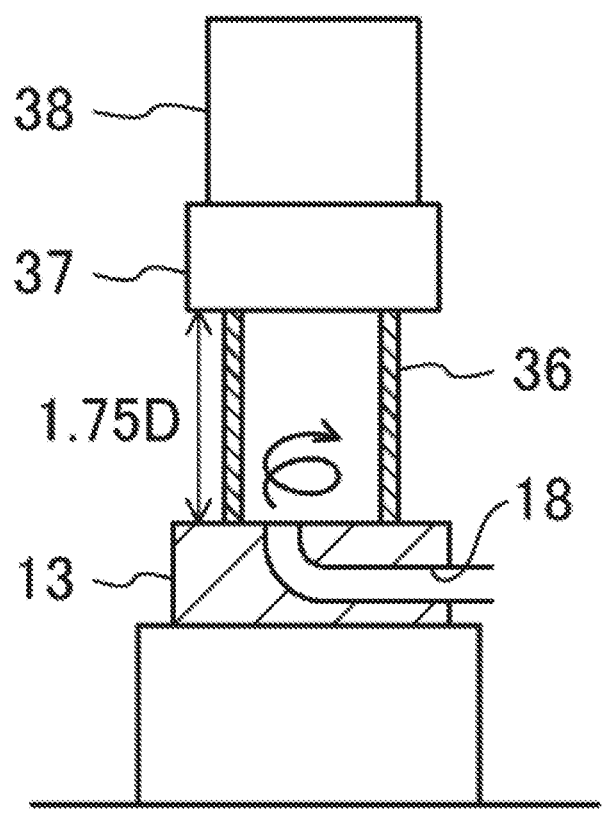
FIG. 6 is a diagram illustrating a rig test device for measuring a swirl ratio.

Here, the intensity of the swirl flow is described. The intensity of the swirl flow is expressed by a swirl ratio. The "swirl ratio" may be defined as a value obtained by dividing a value which is obtained from measuring an intake flow lateral angular speed for each valve lift and integrating the value, by an engine angular speed. The intake flow lateral angular speed may be obtained based on a measurement using a rig test device illustrated in FIG. 6. Specifically, the device illustrated in FIG. 6 is structured by placing the cylinder head 13 upside down on a pedestal to connect the intake port 18 to an intake air supply device (not illustrated), and placing a cylinder 36 on the cylinder head 13 to connect, at its upper end, to an impulse meter 38 having a honeycomb rotor 37. A lower surface of the impulse meter 38 is positioned 1.75D (wherein "D" is a cylinder bore diameter) away from a mating surface between the cylinder head 13 and the cylinder 36. The impulse meter 38 measures torque which acts on the honeycomb rotor 37 by a swirl generated in the cylinder 36 according to the supply of the intake air (see the arrow in FIG. 6), and the intake flow lateral angular speed is obtained based on the torque.

Figure 7:
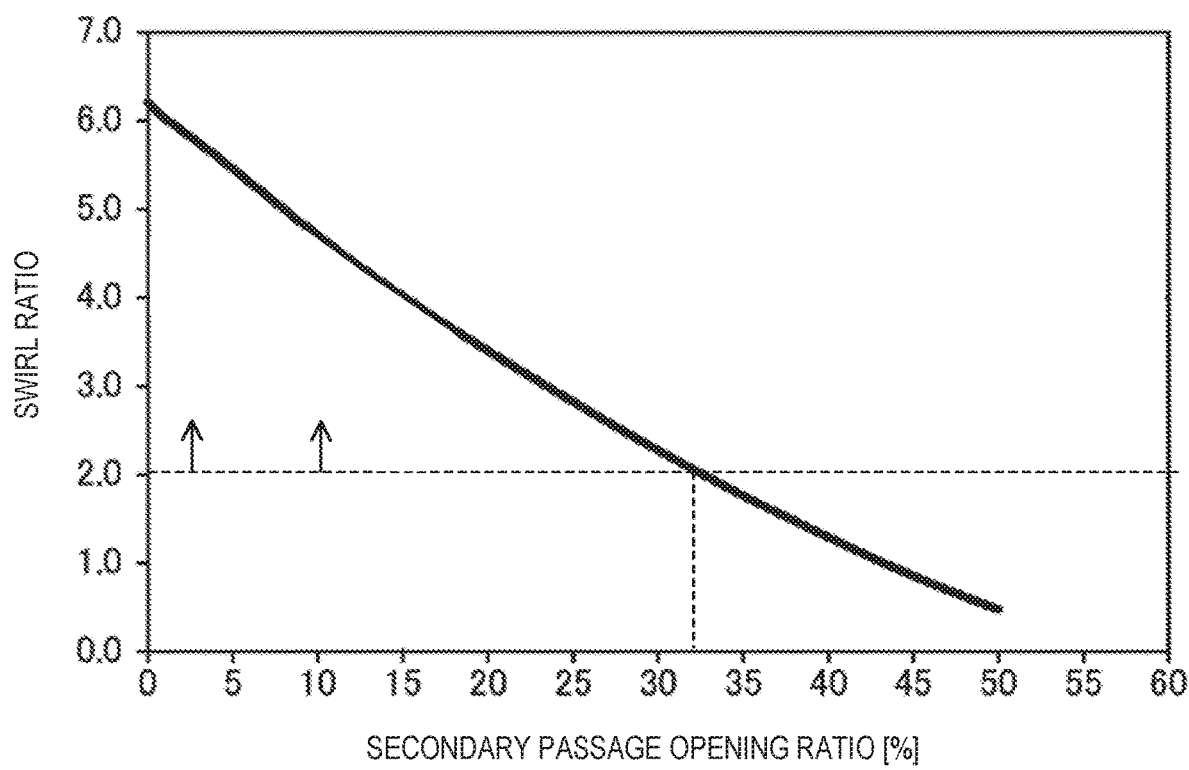
FIG. 7 is a chart illustrating a relationship between an opening ratio of a secondary passage and the swirl ratio.

FIG. 7 illustrates a relationship between the opening of the SCV 56 of the engine 1 and the swirl ratio. In FIG. 7, the opening of the SCV 56 is expressed by an opening ratio with respect to the cross section of the secondary passage 402 when fully opened. The opening ratio of the secondary passage 402 is 0% when the SCV 56 is fully closed, and increases from 0% as the opening of the SCV 56 increases. The opening ratio of the secondary passage 402 is 100% when the SCV 56 is fully opened. As illustrated in FIG. 7, in the engine 1, the swirl ratio becomes around 6 when the SCV 56 is fully closed. In order to set the swirl ratio to be 2 or higher, the opening of the SCV 56 may be adjusted within a range of the opening ratio of 0 to 15%.

Note that alternatively/additionally to attaching the SCV 56 to the intake passage 40, the swirl generating part may adopt a structure in which the open periods of the two intake valves 21 are varied so as to introduce the intake air into the combustion chamber 17 from only one of the intake valves 21. By opening only one of the two intake valves 21, the intake air is introduced unevenly into the combustion chamber 17 and, thus, the swirl flow is generated in the combustion chamber 17. Alternatively, the shapes of the intake ports 18 may be devised so that the swirl generating part generates the swirl flow inside the combustion chamber 17.

An exhaust passage 50 is connected to a side of the engine 1 opposite from the intake passage 40. The exhaust passage 50 communicates with the exhaust ports 19 of the cylinders 11. The exhaust passage 50 is a passage through which the exhaust gas discharged from the combustion chamber 17 flows. Although not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having a plurality of catalytic converters is disposed in the exhaust passage 50. Although not illustrated, the catalytic converter on the upstream side is disposed in an engine bay and has a three-way catalyst 511 and a GPF (Gasoline Particulate Filter) 512. The catalytic converter on the downstream side is disposed outside the engine bay and has a three-way catalyst 513. Note that the exhaust gas purification system is not limited to have the illustrated structure. For example, the GPF 512 may be omitted. Moreover, the catalytic converter is not limited to have the three-way catalyst. Furthermore, the order of arrangements of the three-way catalyst and the GPF may suitably be changed.

An EGR passage 52 constituting an external EGR system is connected between the intake passage 40 and the exhaust passage 50. The EGR passage 52 is a passage for recirculating a portion of the burned gas to the intake passage 40. An upstream end of the EGR passage 52 is connected to the exhaust passage 50 between the upstream catalytic converter and the downstream catalytic converter. A downstream end of the EGR passage 52 is connected to the intake passage 40 upstream of the booster 44. For example, the downstream end of the EGR passage 52 is connected to an intermediate position of the bypass passage 47. The EGR gas flowing through the EGR passage 52 enters the intake passage 40 upstream of the booster 44 without passing through the air bypass valve 48 of the bypass passage 47.

A water-cooling type EGR cooler 53 is disposed in the EGR passage 52. The EGR cooler 53 cools the burned gas. An EGR valve 54 (air-fuel ratio controller) is also disposed in the EGR passage 52. The EGR valve 54 adjusts the flow rate of the burned gas in the EGR passage 52. By adjusting an opening of the EGR valve 54, the recirculation amount of the cooled burned gas (i.e., external EGR gas) is adjusted.

In this configuration example, an EGR system 55 includes the external EGR system including the EGR passage 52 and the EGR valve 54, and an internal EGR system including the intake electrically-operated S-VT 23 and the exhaust electrically-operated S-VT 24 described above. The EGR valve 54 constitutes one of the state function adjusting parts. In the external EGR system, since the EGR passage 52 is connected downstream of the GPF 512 and the EGR cooler 53 is provided, the burned gas at a temperature lower than in the internal EGR system is supplied to the combustion chamber 17.

As illustrated in FIG. 4, a cooling device 71 of the engine 1 includes a main circuit 71A and a sub circuit 71B. The main circuit 71A and the sub circuit 71B are independent from each other. A coolant (i.e., cooling water) does not flow between the main circuit 71A and the sub circuit 71B.

The main circuit 71A has a main radiator 72 which cools the coolant by using traveling air and a variable geometry water pump 74 which supplies the coolant cooled by the main radiator 72 to an engine body 100 comprised of the cylinder head 13 and the cylinder block 12. The water pump 74 is driven by the engine 1. Although not illustrated, the coolant supplied to the engine body 100 flows inside a water jacket formed inside the engine body 100 around the combustion chamber 17 while cooling various parts inside the engine body 100, is discharged from the engine body 100, and then returns to the main radiator 72. A water temperature sensor SW10 described later detects a temperature of the coolant. The temperature of the coolant detected by the water temperature sensor SW10 may be used in various controls of the engine 1 as the temperature of the engine body 100. Although described later in detail, the temperature of the coolant detected by the water temperature sensor SW10 is used as a temperature of a wall surface (wall temperature) of the combustion chamber 17 and utilized in the layer selection in the operating range map of the engine 1.

The sub circuit 71B, similar to the main radiator 72, has a sub radiator 75 which cools the coolant by using traveling air and an electric water pump 76 which supplies the coolant cooled by the sub radiator 75 to the intercooler 46. The coolant supplied to the intercooler 46 cools gas passing through the intercooler 46, is discharged from the intercooler 46, and then returns to the sub radiator 75.

The coolant flowing in the main circuit 71A passes inside the engine body 100. The coolant flowing in the sub circuit 71B does not pass inside the engine body 100. Therefore, the coolant flowing in the main circuit 71A rises its temperature higher than the coolant flowing in the sub circuit 71B. Note that although not illustrated, the EGR cooler 53 is connected to the main circuit 71A.

A control system 20 of the compression-ignition engine includes the ECU 10 configured to operate the engine 1. As illustrated in FIG. 5, the ECU 10 is a controller based on a well-known microcomputer and includes a processor (i.e., a central processing unit (CPU)) 101 configured to execute program(s)/instructions, memory 102 comprised of RAM(s) (Random Access Memory) and ROM(s) (Read Only Memory) and configured to store the program(s)/instructions and data, an input/output bus 103 configured to input and output electric signals, a temperature determining module 104, an air-fuel ratio controlling module 105, a spark plug controlling module 106, and an operating range map selecting module 107. The processor 101 is configured to execute these modules to perform their respective functions. These modules are stored in the memory 102 as software that may be executed by the processor 101. The ECU 10 is one example of "controller." The temperature determining module 104 may be configured to determine whether the temperature of the combustion chamber 17 is at or above a given temperature based on an output value of a temperature sensor configured to detect a parameter related to a temperature of the combustion chamber 17. The air-fuel ratio controlling module 105 may be configured to, when the temperature of the combustion chamber 17 is determined to be below the given temperature at an engine load, to output a control signal to the air-fuel ratio controller to set the air-fuel ratio of the mixture gas substantially to a stoichiometric air-fuel ratio and, when the temperature of the combustion chamber is determined to be above the given temperature at the engine load, to output a control signal to the air-fuel ratio controller to set the air-fuel ratio of the mixture gas leaner than the stoichiometric air-fuel ratio. The spark plug controlling module 106 may be configured to output a control signal to the spark plug 25 to perform the ignition at a given ignition timing so that the mixture gas starts combustion by flame propagation and then unburned mixture gas self-ignites, the given ignition timing being stored in an ignition timing memory 102.

As illustrated in FIGS. 1 and 5, various sensors SW1 to SW17 are connected to the ECU 10. The sensors SW1 to SW17 output detection signals to the ECU 10. The sensors include the following sensors.

That is, the sensors include an airflow sensor SW1 disposed in the intake passage 40 downstream of the air cleaner 41 and configured to detect the flow rate of fresh air in the intake passage 40, a first intake air temperature sensor SW2 also disposed in the intake passage 40 downstream of the air cleaner 41 and configured to detect a temperature of the fresh air, a first pressure sensor SW3 disposed in the intake passage 40 downstream of the connecting position with the EGR passage 52 and upstream of the booster 44, and configured to detect pressure of the gas flowing into the booster 44, a second intake air temperature sensor SW4 disposed in the intake passage 40 downstream of the booster 44 and upstream of the connecting position of the bypass passage 47 and configured to detect a temperature of the gas flowed out of the booster 44, a second pressure sensor SW5 attached to the surge tank 42 and configured to detect pressure of the gas at a position downstream of the booster 44, a third intake air temperature sensor SW17 attached to the surge tank 42 and configured to detect a temperature of the gas inside the surge tank 42, i.e., a temperature of the intake air introduced into the combustion chamber 17, pressure sensors SW6 attached to the cylinder head 13 corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chamber 17, a linear $O_2$ sensor SW8 disposed in the exhaust passage 50 upstream of the upstream catalytic converter and configured to detect an oxygen concentration within the exhaust gas, a lambda $O_2$ sensor SW9 disposed in the upstream catalytic converter downstream of the three-way catalyst 511 and configured to detect an oxygen concentration within the exhaust gas, the water temperature sensor SW10 attached to the engine 1 and configured to detect a temperature of the coolant, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of the intake camshaft, an exhaust cam angle sensor SW14 attached to the engine 1 and configured to detect a rotational angle of the exhaust camshaft, an EGR pressure difference sensor SW15 disposed in the EGR passage 52 and configured to detect a difference in pressure between positions upstream and downstream of the EGR valve 54, and a fuel pressure sensor SW16 attached to the common rail 64 of the fuel supply system 61 and configured to detect pressure of the fuel to be supplied to the injector 6.

Based on these detection signals, the ECU 10 determines the operating state of the engine 1 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56.

For example, the ECU 10 sets a target torque of the engine 1 and determines a target boosting pressure, based on the detection signal of the accelerator opening sensor SW12 and a preset map. Then, the ECU 10 executes a feedback control to bring the boosting pressure to the target boosting pressure by adjusting the opening of the air bypass valve 48 based on the target boosting pressure and a pressure difference between the upstream and downstream sides of the booster 44 obtained from the detection signals of the first pressure sensor SW3 and the second pressure sensor SW5.

Further, the ECU 10 sets a target EGR ratio (that is, a ratio of the EGR gas with respect to all the gas in the combustion chamber 17) based on the operating state of the engine 1 and a preset map. Then, the ECU 10 determines a target EGR gas amount based on the target EGR ratio and the intake air amount based on the detection signal of the accelerator opening sensor SW12. Then, the ECU 10 executes a feedback control to bring the external EGR gas amount introduced into the combustion chamber 17 to the target EGR gas amount by adjusting the opening of the EGR valve 54 based on the pressure difference between the upstream and downstream sides of the EGR valve 54 obtained from the detection signal of the EGR pressure difference sensor SW15.

Further, the ECU 10 executes an air-fuel ratio feedback control when a given control condition is satisfied. For example, based on the oxygen concentrations within the exhaust gas detected by the linear $O_2$ sensor SW8 and the lambda $O_2$ sensor SW9, the ECU 10 adjusts the fuel injection amount of the injector 6 to bring the air-fuel ratio of the mixture gas to a desired value.

Note that details of other controls of the engine 1 by the ECU 10 are described later.

(Operating Range of Engine)

Figure 8:
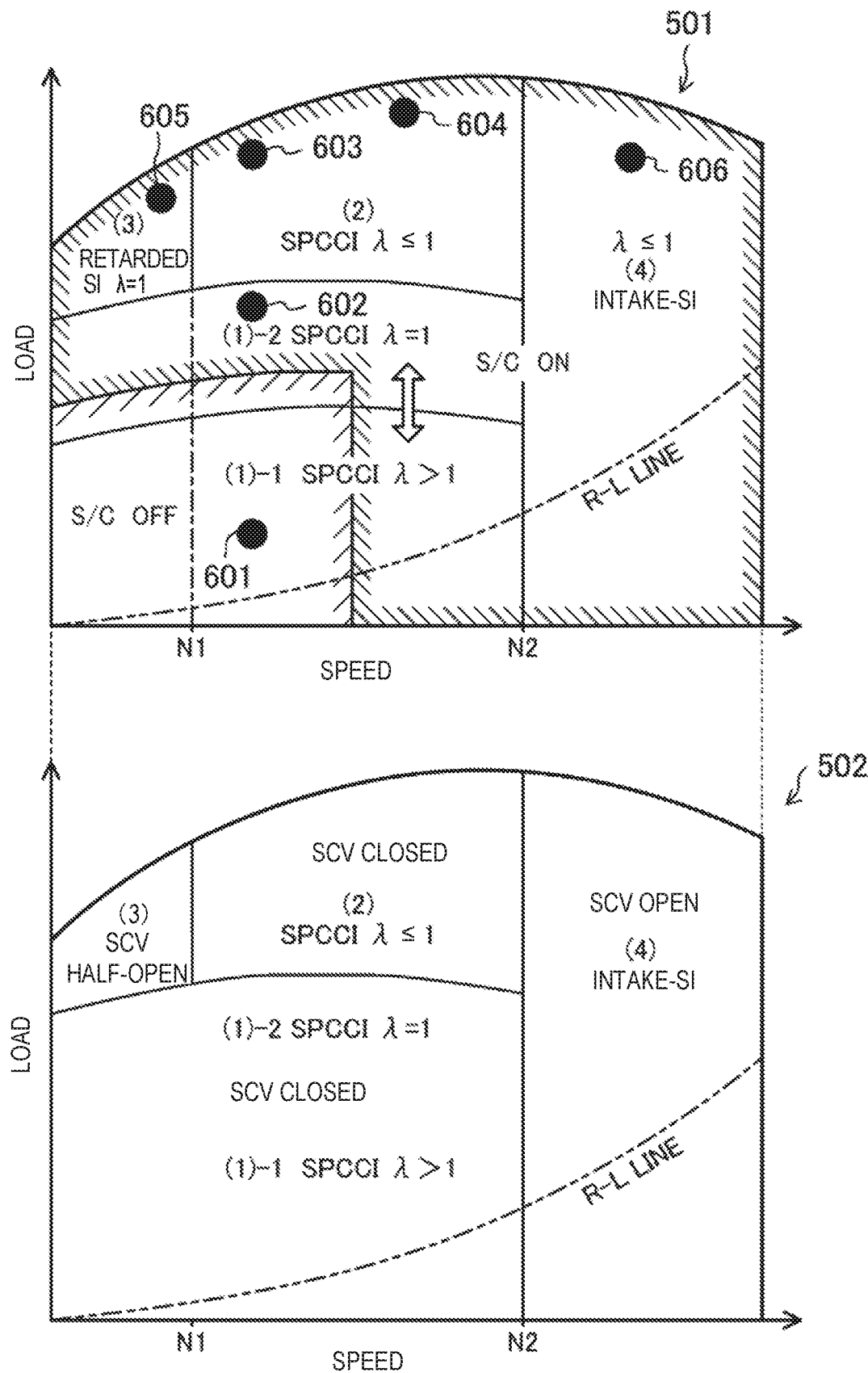
FIG. 8 shows charts illustrating operating range maps of the engine.

FIG. 8 illustrates the operating range map of the engine 1 in a warmed-up state of the engine. Operating range maps 501 and 502 of the engine 1 are divided into five ranges in terms of the engine load and the engine speed. For example, the five ranges include: a low load range (1)-1 including the idle operation and extending in low and medium engine speed ranges; a medium load range (1)-2 in which the engine load is higher than the low load range and extending in the low and medium engine speed ranges; a high-load medium-speed range (2) in which the engine load is higher than the medium load range (1)-2 and which is located in the high load range including the full engine load; a high-load low-speed range (3) located in the high load range and in which the engine speed is lower than the high-load medium-speed range (2); and a high speed range (4) in which the engine speed is higher than the low load range (1)-1, the medium load range (1)-2, the high-load medium-speed range (2), and the high-load low-speed range (3). Here, the low speed range, the medium speed range, and the high speed range may be defined by substantially evenly dividing, in the engine speed direction, the entire operating range of the engine 1 into three ranges of the low speed range, the medium speed range and the high speed range. In the example of FIG. 8, the engine speed lower than a speed N1 is defined as low, the engine speed higher than a speed N2 is defined as high, and the engine speed between the engine speeds N1 and N2 is defined as medium. For example, the speed N1 may be about 1,200 rpm and the speed N2 may be about 4,000 rpm. Note that the two-dotted chain line in FIG. 8 indicates the road-load line of the engine 1. In FIG. 8, the operating range maps 501 and 502 of the engine 1 are separately illustrated for the sake of easier understanding. The map 501 illustrates a state of the mixture gas and a combustion mode within each range, and a driving range and a non-driving range of the booster 44. The map 502 illustrates the opening of the SCV 56 within each range.

In the warmed-up state, mainly for improving the fuel efficiency and the exhaust gas performance, the engine 1 performs combustion by compression self-ignition within the low load range (1)-1, the medium load range (1)-2, and the high-load medium-speed range (2). Further, the engine 1 performs the combustion by spark-ignition within the other ranges, specifically, the high-load low-speed range (3) and the high speed range (4).

(Concept of SPCCI Combustion)

In the combustion caused by self-ignition, the timing of the self-ignition changes greatly if the temperature inside the combustion chamber 17 varies before the compression starts. Therefore, the engine 1 performs the SPCCI combustion in which the SI combustion and the CI combustion are combined.

In the SPCCI combustion, the spark plug 25 forcibly ignites the mixture gas inside the combustion chamber 17 to combust it through flame propagation, and the heat generated by the SI combustion raises the temperature inside the combustion chamber 17 and the pressure inside the combustion chamber 17 rises by flame propagation, which leads to the CI combustion of unburned mixture gas by self-ignition.

It is possible to reduce the variation of the temperature inside the combustion chamber 17 before the compression starts by adjusting the heat generation amount in the SI combustion. Therefore, even when the temperature inside the combustion chamber 17 varies before the compression starts, for example, by controlling the ignition timing to adjust the start timing of the SI combustion, the mixture gas self-ignites at a target timing.

In the SPCCI combustion, the heat generation in the SI combustion is slower than the heat generation in the CI combustion. The waveform of the heat generation rate in the SPCCI combustion has a relatively gentle slope as indicated by the reference characters 6014, 6024, 6034, and 6043 of FIG. 9. Moreover, a pressure variation (dp/dθ) in the combustion chamber 17 is gentler in the SI combustion than in the CI combustion.

When the temperature and pressure inside the combustion chamber 17 rise due to the SI combustion, the unburned mixture gas self-ignites. In the example of the waveforms 6014, 6024, 6034, and 6043 of the heat generation rate illustrated in FIG. 9, the slope of the waveform changes from gentle to sharp depending on the timing of self-ignition. i.e., the waveform of the heat generation rate has a flexion point at a timing when the CI combustion starts.

After the CI combustion starts, the SI combustion and the CI combustion are performed in parallel. In the CI combustion, since the heat generation is larger than in the SI combustion, the heat generation rate becomes relatively high. Note that since the CI combustion is performed after CTDC, the piston 3 descends by motoring. Therefore, the slopes of the waveforms 6014, 6024, 6034, and 6043 of the heat generation rate by the CI combustion are prevented from becoming excessively sharp. The dp/dθ in the CI combustion also becomes relatively gentle.

The dp/dθ is usable as an index expressing the combustion noise. Since the SPCCI combustion is able to lower the dp/dθ as described above, it becomes possible to avoid combustion noise from becoming excessively loud. Thus, combustion noise is reduced below an allowable value.

The SPCCI combustion ends by finishing the CI combustion. The CI combustion has a shorter combustion period than in the SI combustion. The SPCCI combustion advances the combustion end timing compared to the SI combustion. In other words, the SPCCI combustion brings the combustion end timing on the expansion stroke closer to CTDC. The SPCCI combustion is advantageous in improving the fuel efficiency of the engine 1 than the SI combustion.

As described above, the heat generation rate waveform of the SPCCI combustion is formed to have a first heat generation rate portion formed by the SI combustion and having a relatively gentle rising slope, a second heat generation rate portion formed by the CI combustion and having a relatively sharp rising slope, which are next to each other in this order. Further, a combustion controller (e.g., EGR system, variable valve mechanism, intake air amount controller) is controlled to change the heat generation amount of the SI combustion (i.e., the first heat generation rate portion) according to the operating state of the engine, so that the start timing of the CI combustion (i.e., the second heat generation rate portion) reaches a target CI combustion start timing set according to the operating state of the engine.

When performing the SPCCI combustion, the engine generates a strong swirl flow inside the combustion chamber 17. The swirl ratio may be, for example, 2 or above.

Figure 10:
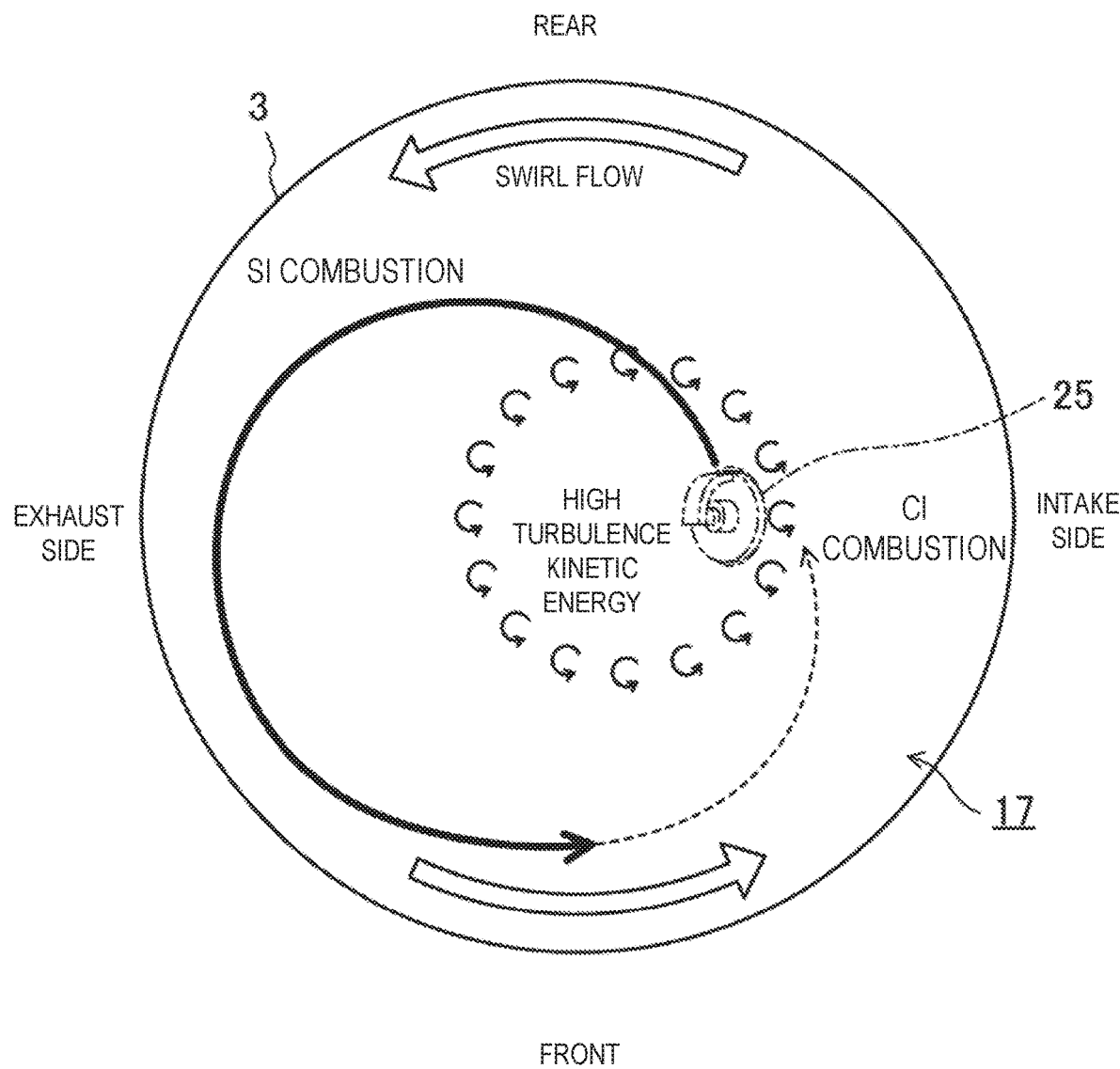
FIG. 10 is a plan view of the combustion chamber, illustrating a concept of SPCCI combustion.

FIG. 10 illustrates a concept of the SPCCI combustion. When the strong swirl flow is generated in the combustion chamber 17, as indicated by outlined arrows in FIG. 10, the swirl flow has a strong stream in the outer circumferential portion of the combustion chamber 17. On the other hand, the swirl flow has a relatively weak stream in the center portion, and by a whirling flow caused by a velocity gradient in a boundary between the center portion and the outer circumferential portion, the center portion has a higher turbulence kinetic energy.

When the spark plug 25 ignites the mixture gas in the center portion, the combustion speed increases and the SI combustion is stabilized by the high turbulence kinetic energy, and, as indicated by the black arrow in FIG. 10, the flame of the SI combustion propagates in the circumferential direction along the strong swirl flow inside the combustion chamber 17. When the internal space of the combustion chamber 17 is divided into four sections of an intake-rear section, an exhaust-rear section, an exhaust-front section, and an intake-front section, the spark plug 25 is disposed on the intake side of the center axis X1 of the cylinder 11 in terms of the intake-exhaust directions. Additionally, since the swirl flow is directed in the counterclockwise direction in FIG. 10, the flame of the SI combustion flows from the intake-rear section to the intake-front side section through the exhaust-rear section and the exhaust-front section. The heat generation in the SI combustion and pressure increase by flame propagation cause the unburned mixture gas to ignite by compression in the intake-front section as indicated by the dashed arrow in FIG. 10, and the CI combustion is performed over the outer circumferential portion to the center portion of the combustion chamber 17.

In the concept of this SPCCI combustion, by generating the strong swirl flow inside the combustion chamber 17, the SI combustion is sufficiently performed until the CI combustion starts. As a result, the generation of combustion noise is reduced and, since the combustion temperature does not become excessively high, generation of $NO_x$ is also reduced. Further, the variation in torque between cycles is reduced.

In addition, the concept of SPCCI combustion, since the SI combustion flame propagates in the circumferential direction along the wall surface of the combustion chamber 17, is advantageous in that knocking accompanied with high-frequency vibration is less likely to occur compared to general SI combustion performed by disposing the spark plug 25 at the center of the cylinder 11 and propagating flame radially outward from the center of the combustion chamber 17. Moreover, in the SPCCI combustion, since pressure fluctuation during the CI combustion is relatively gentle as described above, occurrence of a diesel knock is prevented.

(Operation of Engine within Each Range)

Figure 9:
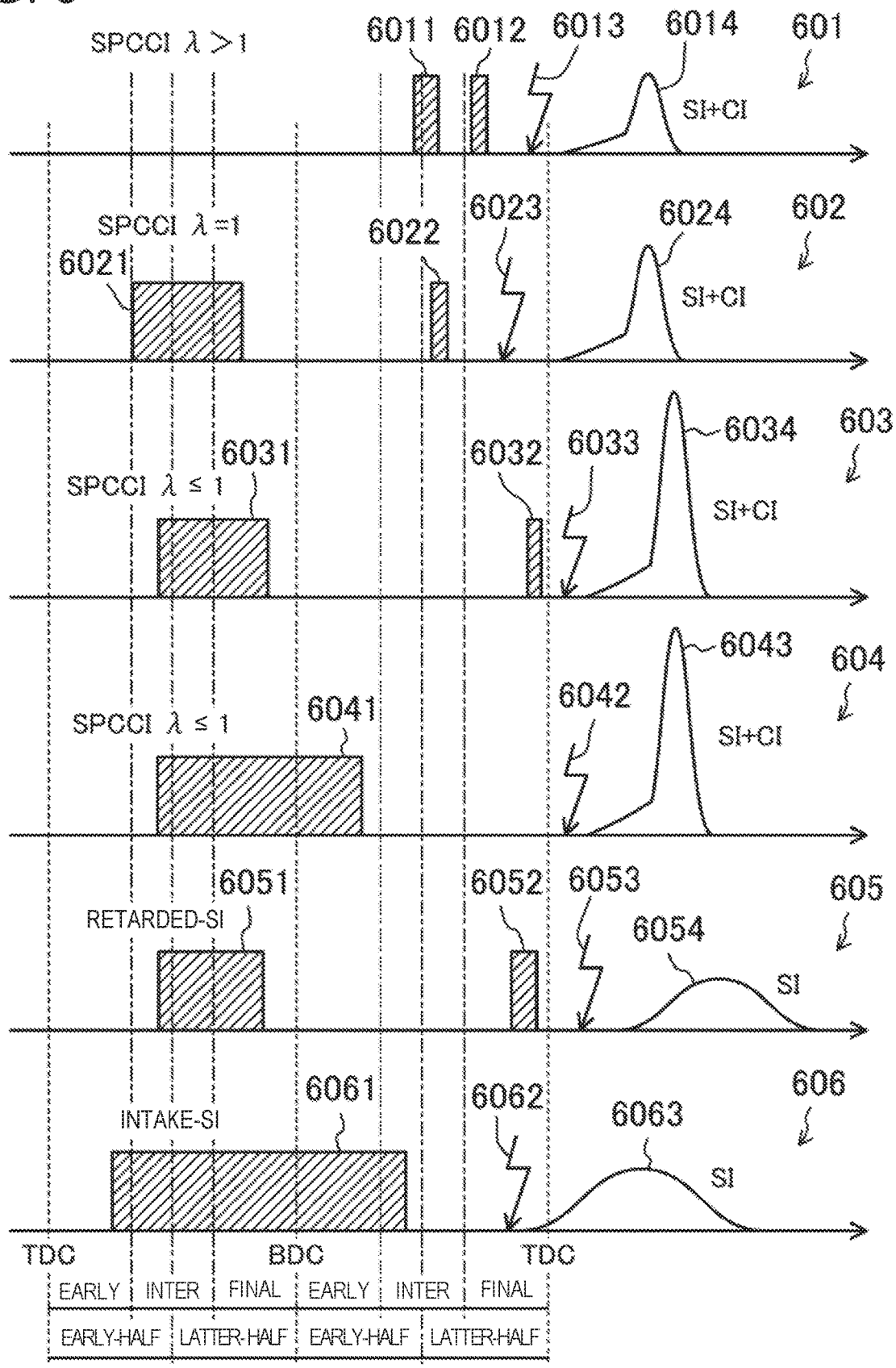
FIG. 9 shows charts illustrating a fuel injection timing, an ignition timing, and a combustion waveform in the respective operating ranges on the operating range maps of FIG. 8.

Hereinafter, the operation of the engine 1 within each range of the operating range maps 501 and 502 of FIG. 8 is described in detail with reference to the fuel injection timing and the ignition timing illustrated in FIG. 9. The horizontal axis of FIG. 9 is a crank angle. Note that, the reference characters 601, 602, 603, 604, 605, and 606 in FIG. 9 correspond to the operating state of the engine 1 indicated by the reference characters 601, 602, 603, 604, 605, and 606 on the operating range map 501 of FIG. 8.

(Low Load Range (1)-1)

When the engine 1 is operating within the low load range (1)-1, the engine 1 performs the SPCCI combustion.

A reference character 601 in FIG. 9 indicates one example of fuel injection timings (reference characters 6011 and 6012) and an ignition timing (a reference character 6013), and a combustion waveform (i.e., a waveform indicating a change in heat generation rate with respect to the crank angle; a reference character 6014) when the engine 1 is operating in the operating state of the reference character 601 within the low load range (1)-1 of the engine 1.

In order to improve the fuel efficiency of the engine 1, the EGR system 55 introduces the EGR gas into the combustion chamber 17 when the engine 1 is operating within the low load range (1)-1. For example, by providing the positive overlap period in which the intake valve 21 and the exhaust valve 22 are both opened near TDC of the exhaust stroke, a portion of the exhaust gas discharged from the combustion chamber 17 to the intake port 18 and the exhaust port 19 is reintroduced into the combustion chamber 17. Since hot burned gas is introduced into the combustion chamber 17 in this case, the temperature in the combustion chamber 17 increases, which is advantageous in stabilizing the SPCCI combustion. Note that a negative overlap period between the intake valve 21 and the exhaust valve 22 may be provided.

When the engine 1 is operating within the low load range (1)-1, the strong swirl flow is formed in the combustion chamber 17. The SCV 56 is fully closed or has a given narrow opening. As described above, since the intake port 18 is a tumble port, an oblique swirl flow having a tumble component and a swirl component is formed in the combustion chamber 17.

When the engine 1 operates within the low load range (1)-1, the swirl ratio is 2 or above. When the engine 1 operates within the low load range (1)-1, the swirl ratio may be between 2 and 6. As illustrated in FIG. 7, the opening of the SCV 56 may be adjusted within a range of the opening ratio of about 0% to 15%. By generating the swirl flow inside the combustion chamber 17 strong, the SPCCI combustion is suitably performed.

When the engine 1 operates within the low load range (1)-1, the air-fuel ratio (A/F) of the mixture gas is leaner than the stoichiometric air-fuel ratio in the entire combustion chamber 17. That is, the excess air ratio λ of the mixture gas exceeds 1 in the combustion chamber 17 as a whole. More specifically, the A/F of the mixture gas in the entire combustion chamber 17 is 30:1 or higher. In this manner, generation of raw $NO_x$ is reduced and the exhaust gas performance is improved.

When the engine 1 operates within the low load range (1)-1, the mixture gas is stratified between the center portion and the outer circumferential portion of the combustion chamber 17. The center portion of the combustion chamber 17 is the portion where the spark plug 25 is disposed, and the outer circumferential portion is the portion around the center portion and in contact with a liner of the cylinder 11. The center portion of the combustion chamber 17 may be defined as a portion where the swirl flow is weak and the outer circumferential portion may be defined as a portion where the swirl flow is strong.

The fuel concentration of the mixture gas in the center portion is higher than that in the outer circumferential portion. For example, the A/F of the mixture gas in the center portion is between 20:1 and 30:1, and the A/F of the mixture gas in the outer circumferential portion is 35:1 or higher. Note that the A/F is the air-fuel ratio at the ignition timing, and the same applies for the description below. By setting the A/F of the mixture gas near the spark plug 25 between 20:1 to 30:1, the generation of raw $NO_x$ during the SI combustion is reduced while allowing flame propagation of the SI combustion. Further by setting the A/F of the mixture gas in the outer circumferential portion to 35:1 or above, the CI combustion is stably performed.

When the engine 1 operates within the low load range (1)-1, the injector 6 injects the fuel into the combustion chamber 17 a plurality of times on the compression stroke (the reference characters 6011 and 6012). The mixture gas is stratified in the center portion and the outer circumferential portion of the combustion chamber 17 by the plurality of fuel injections and the swirl flow inside the combustion chamber 17.

After the fuel injection is ended, the spark plug 25 ignites the mixture gas in the center portion of the combustion chamber 17 at the given timing before CTDC (the reference character 6013). Since the fuel concentration of the mixture gas in the center portion is relatively high, ignitability improves and the SI combustion by flame propagation stabilizes. By stabilizing the SI combustion, the CI combustion starts at the suitable timing. The controllability of the CI combustion improves in the SPCCI combustion. As a result, when the engine 1 operates within the low load range (1)-1, both the reduction of the generation of combustion noise and the improvement of the fuel efficiency by the shortening of the compression period are achieved.

Since the engine 1 performs the SPCCI combustion by making the mixture gas leaner than the stoichiometric air-fuel ratio within the low load range (1)-1 as described above (i.e., SPCCI lean). The fuel efficiency of the engine 1 is significantly improved.

(Medium Load Range (1)-2)

Also when the engine 1 is operating within the medium load range (1)-2, the engine 1 performs the SPCCI combustion similarly to the low load range (1)-1.

The reference character 602 in FIG. 9 indicates one example of the fuel injection timings (reference characters 6021 and 6022) and the ignition timing (a reference character 6023), and the combustion waveform (a reference character 6024) when the engine 1 is operating in the operating state of the reference character 602 within the medium load range (1)-2 of the engine 1.

The EGR system 55 introduces the EGR gas into the combustion chamber 17 when the operating state of the engine 1 is within the medium load range (1)-2. For example, similar to the low load range (1)-1, by providing the positive overlap period in which the intake valve 21 and the exhaust valve 22 are both opened near TDC of the exhaust stroke, a portion of the exhaust gas discharged from the combustion chamber 17 to the intake port 18 and the exhaust port 19 is reintroduced into the combustion chamber 17. That is, the internal EGR gas is introduced into the combustion chamber 17. Further, within the medium load range (1)-2, the exhaust gas cooled by the EGR cooler 53 is introduced into the combustion chamber 17 through the EGR passage 52. That is, the external EGR gas at a lower temperature than the internal EGR gas is introduced into the combustion chamber 17. Within the medium load range (1)-2, the internal EGR gas and/or external EGR gas is introduced into the combustion chamber 17 to adjust the temperature in the combustion chamber 17 to an appropriate temperature.

Also when the engine 1 operates within the medium load range (1)-2, similar to the low load range (1)-1, a strong swirl flow at a swirl ratio of 2 or above is formed in the combustion chamber 17. The SCV 56 is fully closed or has a given narrow opening. By enhancing the swirl flow, when the engine 1 operates within the medium load range (1)-2, the SPCCI combustion is suitably performed.

When the engine 1 operates within the medium load range (1)-2, the air-fuel ratio (A/F) of the mixture gas is at the stoichiometric air-fuel ratio (A/F≈14.7:1) in the entire combustion chamber 17. The three-way catalysts 511 and 513 purify the exhaust gas discharged from the combustion chamber 17. Thus, the exhaust gas performance of the engine 1 is improved. A/F of the mixture gas may be set to remain within a purification window of the three-way catalyst (i.e., an air-fuel ratio width exhibiting the three-way purification function). Therefore, an excess air ratio λ of the mixture gas may be 1.0±0.2. As described above, since the EGR gas is introduced into the combustion chamber 17, a mass ratio (G/F) between all the gas and the fuel in the combustion chamber 17 is lean. When the engine 1 operates within the medium load range (1)-2, the G/F may be set 18 or above. Thus, so-called knocking occurrence is avoided. The G/F may alternatively be set between 18 and 30. The G/F may further alternatively be set between 18 and 50.

When the engine 1 operates within the medium load range (1)-2, the injector 6 performs the fuel injection on the intake stroke (reference character 6021) and the fuel injection on the compression stroke (reference character 6022). By performing the first injection 6021 on the intake stroke, the fuel is distributed substantially evenly in the combustion chamber 17. By performing the second injection 6022 on the compression stroke, the temperature in the combustion chamber 17 is reduced by latent heat of vaporization of the fuel. The mixture gas containing the fuel injected in the first injection 6021 is prevented from causing pre-ignition. Note that the operating state 602 is an operating state where the engine load is relatively high within the medium load range (1)-2. Within the medium load range (1)-2, the second injection 6022 may be omitted. Particularly in the operating state where the engine load is low within the medium load range (1)-2, the second injection 6022 may be omitted.

By the injector 6 performing the first injection 6021 and the second injection 6022, in the combustion chamber 17, substantially homogeneous mixture gas in which the excess air ratio λ is 1.0±0.2 is formed. Since the mixture gas is substantially homogeneous, the improvement in fuel efficiency by reducing the unburned fuel loss and the improvement in the exhaust gas performance by avoiding the smoke generation are achieved. The excess air ratio λ is preferably 1.0 to 1.2.

By the spark plug 25 igniting the mixture gas at the given timing before CTDC (reference character 6023), the mixture gas combusts by flame propagation. After this combustion starts, the unburned mixture gas self-ignites and causes the CI combustion.

Therefore, the engine 1 performs the SPCCI combustion by bringing the mixture gas to have the stoichiometric air-fuel ratio within the medium load range (1)-2 (i.e., SPCCI λ=1). The exhaust gas discharged from the combustion chamber 17 is purified by using the three-way catalysts 511 and 513. Further, by introducing the EGR gas into the combustion chamber 17 to dilute the mixture gas, fuel efficiency of the engine 1 improves.

Here, as illustrated in FIG. 8, the booster 44 is turned off (see "S/C OFF") within part of the low load range (1)-1 and part of the medium load range (1)-2. In detail, the booster 44 is turned off within a low speed segment of the low load range (1)-1. Within a high speed segment of the low load range (1)-1, the booster 44 is turned on to increase the boosting pressure in order to secure a required intake charge amount corresponding to the engine speed being high. Further, within a low-load low-speed segment of the medium load range (1)-2, the booster 44 is turned off. Within a high load segment of the medium load range (1)-2, the booster 44 is turned on in order to secure the required intake charge amount corresponding to the engine speed being high. Within the high speed segment, the booster 44 is turned on in order to secure the required intake charge amount corresponding to the engine speed being high.

Note that within the high-load medium-speed range (2), the high-load low-speed range (3), and the high speed range (4), the booster 44 is turned on throughout the ranges (see "S/C ON").

(High-Load Medium-Speed Range (2))

Also when the engine 1 is operating within the high-load medium-speed range (2), the engine 1 performs the SPCCI combustion similarly to the low load range (1)-1 and the medium load range (1)-2.

The reference character 603 in FIG. 9 indicates the fuel injection timings (reference characters 6031 and 6032) and the ignition timing (a reference character 6033), and the combustion waveform (a reference character 6034) when the engine 1 is operating in the operating state 603 at the low speed segment within the high-load medium-speed range (2) of the engine 1. Further, the reference character 604 indicates the fuel injection timing (a reference character 6041) and the ignition timing (a reference character 6042), and the combustion waveform (a reference character 6043) when the engine 1 is operating in the operating state 604 at the high speed side within the high-load medium-speed range (2) of the engine 1.

The EGR system 55 introduces the EGR gas into the combustion chamber 17 when the operating state of the engine 1 is within the high-load medium-speed range (2). The engine 1 reduces the EGR gas amount as the engine load increases.

Also when the engine 1 operates within the high-load medium-speed range (2), similar to the low load range (1)-1, a strong swirl flow at a swirl ratio of 2 or above is formed in the combustion chamber 17. The SCV 56 is fully closed or has a given narrow opening. Since the swirl flow is strong, the SPCCI combustion is suitably performed.

When the engine 1 operates within the high-load medium-speed range (2), the air-fuel ratio (A/F) of the mixture gas is at or richer than the stoichiometric air-fuel ratio in the entire combustion chamber 17 (i.e., the excess air ratio λ of the mixture gas is λ≤1). When the engine 1 operates within the high-load medium-speed range (2), the G/F may be set to 18 or above. The G/F may alternatively be set between 18 and 30. The G/F may further alternatively be set between 18 and 50.

When the engine 1 operates in the operating state 603 of the high-load medium-speed range (2), the injector 6 performs the first-stage injection 6031 on the intake stroke and performs the second-stage injection 6032 on the compression stroke. The first-stage injection may be started, for example, in the early half of the intake stroke, and the second-stage injection may be performed, for example, in a final stage of the compression stroke. The early half of the intake stroke may be defined by evenly dividing the intake stroke into two parts of the early half and the latter half. For example, the first-stage injection may start the fuel injection at 280° CA before CTDC.

When the injection of the first-stage injection 6031 is started in the early half of the intake stroke, although is not illustrated, the fuel spray hits an opening edge of the cavity 31 so that a portion of the fuel enters a squish area 171 of the combustion chamber 17 (i.e., outside the cavity 31 (see FIG. 2)) and the rest of the fuel enters the section within the cavity 31. The swirl flow is strong in the outer circumferential portion of the combustion chamber 17 and weak in the center portion. Therefore, the fuel entered the squish area 171 joins the swirl flow, and the fuel entered the section within the cavity 31 joins the inner side of the swirl flow. The fuel joined the swirl flow remains in the swirl flow during the intake stroke and the compression stroke and forms the mixture gas for the CI combustion in the outer circumference portion of the combustion chamber 17. The fuel entered the inner side of the swirl flow also remains at the inner side of the swirl flow during the intake stroke and the compression stroke and forms the mixture gas for the SI combustion in the center portion of the combustion chamber 17.

When the engine 1 operates within the high-load medium-speed range (2), the fuel concentration of the mixture gas in the outer circumferential portion of the combustion chamber 17 is brought higher than the fuel concentration of the mixture gas in the center portion, and the fuel amount in the mixture gas in the outer circumferential portion is brought larger than that in the center portion. For example, the excess air ratio λ of the mixture gas in the center portion where the spark plug 25 is disposed is 1 or less, and the excess air ratio λ of the mixture gas in the outer circumferential portion is less than 1. The air-fuel ratio (A/F) of the mixture gas in the center portion may be, for example, between 13:1 and the stoichiometric air-fuel ratio (14.7:1). Further, the air-fuel ratio of the mixture gas in the outer circumferential portion may be, for example, between 11:1 and the stoichiometric air-fuel ratio, or between 11:1 and 12:1. Since the amount of fuel within the mixture gas increases in the outer circumferential portion of the combustion chamber 17, the temperature decreases by the latent heat of vaporization of the fuel. The air-fuel ratio of the mixture gas in the entire combustion chamber 17 may be between 12.5:1 and the stoichiometric air-fuel ratio, preferably between 12.5:1 and 13:1.

The final stage of the compression stroke may be the final stage when the compression stroke is evenly divided into three stages of an initial stage, an intermediate stage, and the final stage. The second-stage injection 6032 performed in the final stage of the compression stroke may start the fuel injection at 10° CA before TDC. By performing the second-stage injection immediately before TDC, the temperature in the combustion chamber 17 is lowered by the latent heat of vaporization of the fuel. Although a low-temperature oxidation reaction of the fuel injected by the first-stage injection 6031 progresses on the compression stroke and transitions to a high-temperature oxidation reaction before TDC, by performing the second-stage injection 6032 immediately before TDC so as to lower the temperature inside the combustion chamber, the transition from the low-temperature oxidation reaction to the high-temperature oxidation reaction is avoided and pre-ignition is prevented. Note that the ratio between the injection amount of the first-stage injection and the injection amount of the second-stage injection may be, for example, 95:5.

The spark plug 25 ignites the mixture gas in the center portion of combustion chamber 17 near CTDC (reference character 6033). The spark plug 25 ignites, for example, at or after CTDC. Since the spark plug 25 is disposed in the center portion of the combustion chamber 17, the ignition of the spark plug 25 causes the mixture gas in the center portion to start the SI combustion by flame propagation.

When the engine 1 operates in the operating state 604 of the high-load medium-speed range (2), the injector 6 starts the fuel injection on the intake stroke (a reference character 6041).

The injection 6041 starting on the intake stroke may start the fuel injection in the early half of the intake stroke similarly to the above description. For example, the injection 6041 may start the fuel injection at 280° CA before TDC. The injection 6041 may last over the intake stroke and end on the compression stroke. By setting the start of injection of the injection 6041 in the early half of the intake stroke, the mixture gas for the CI combustion is formed in the outer circumferential portion of the combustion chamber 17 and the mixture gas for the SI combustion is formed in the center portion of the combustion chamber 17 as described above. Similar to the above description, the excess air ratio λ of the mixture gas in the center portion where the spark plug 25 is disposed preferably is 1 or less, and the excess air ratio λ of the mixture gas in the outer circumferential portion is 1 or less, preferably below 1. The air-fuel ratio (A/F) of the mixture gas in the center portion may be, for example, between 13:1 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, or between 11:1 and 12:1. The air-fuel ratio of the mixture gas in the entire combustion chamber 17 may be between 12.5:1 and the stoichiometric air-fuel ratio, preferably between 12.5:1 and 13:1.

When the engine speed increases, the time length during which the fuel injected in the injection 6041 reacts becomes shorter. Therefore, the second-stage injection for suppressing the oxidation reaction of the mixture gas may be omitted. The spark plug 25 ignites the mixture gas in the center portion of combustion chamber 17 near CTDC (a reference character 6042). The spark plug 25 ignites, for example, at or after CTDC.

Within the high load range, the fuel injection amount increases as well as the temperature of the combustion chamber 17, therefore the CI combustion is likely to start early. In other words, within the high load range, the pre-ignition of the mixture gas is likely to occur. However, since the temperature of the outer circumferential portion of the combustion chamber 17 is lowered by the latent heat of vaporization of the fuel as described above, the CI combustion is prevented from starting immediately after the mixture gas is spark-ignited.

By the combination of stratifying the mixture gas in the combustion chamber 17 and causing the strong swirl flow inside the combustion chamber 17, the SI combustion is sufficiently performed until the CI combustion starts. As a result, the generation of combustion noise is reduced and, since the combustion temperature does not become excessively high, generation of $NO_x$ is also reduced. Further, the variation in torque between cycles is reduced.

Further, since the temperature in the outer circumferential portion is low, the CI combustion becomes slower and the generation of the combustion noise is reduced. Moreover, since the combustion period is shortened by the CI combustion, within the high load range, the torque improves and also the thermal efficiency improves. Thus, by performing the SPCCI combustion within the high engine load range, the engine 1 is improved in fuel efficiency while avoiding combustion noise.

As described above, the engine 1 performs the SPCCI combustion by setting the mixture gas to or leaner than the stoichiometric air-fuel ratio within the high-load medium-speed range (2) (i.e., SPCCI λ≤1). Also within this range, the exhaust gas discharged from the combustion chamber 17 is purified by using the three-way catalysts 511 and 513. Further, by introducing the EGR gas into the combustion chamber 17 to dilute the mixture gas, the fuel efficiency of the engine 1 improves.

(High-Load Low-Speed Range (3))

When the engine speed is low, the time length for the crank angle to change 1° becomes longer. Therefore, the reaction of the fuel injected into the combustion chamber 17 may progress excessively and cause pre-ignition even when the SPCCI combustion is to be performed. When the engine 1 is operating within the high-load low-speed range (3), the engine 1 performs the SI combustion instead of the SPCCI combustion.

A reference character 605 in FIG. 9 indicates the fuel injection timings (reference characters 6051 and 6052) and the ignition timing (a reference character 6053), and the combustion waveform (a reference character 6054) when the engine 1 is operating in the operating state 605 within the high-load low-speed range (3) of the engine 1.

The EGR system 55 introduces the EGR gas into the combustion chamber 17 when the operating state of the engine 1 is within the high-load low-speed range (3). The engine 1 reduces the EGR gas amount as the engine load increases. At the full load, the EGR gas may be set to zero.

When the engine 1 operates within the high-load low-speed range (3), the air-fuel ratio (A/F) of the mixture gas is at the stoichiometric air-fuel ratio (A/F≈14.7:1) in the entire combustion chamber 17. A/F of the mixture gas may be set to remain within the purification window of the three-way catalyst. Therefore, an excess air ratio λ of the mixture gas may be 1.0±0.2. By setting the air-fuel ratio of the mixture gas to the stoichiometric air-fuel ratio, the fuel efficiency improves within the high-load low-speed range (3). Note that when the engine 1 operates within the high-load low-speed range (3), the fuel concentration of the mixture gas in the entire combustion chamber 17 may be set so that the excess air ratio λ is 1 or less and higher than the excess air ratio λ within the high-load medium-speed range (2).

When the engine 1 operates within the high-load low-speed range (3), the injector 6 injects the fuel into the combustion chamber 17 at a timing on the intake stroke (the reference character 6051) and at a timing in the period from the final stage of the compression stroke to an early stage of the expansion stroke (hereinafter, referred to as "the retard period") (the reference character 6052). The early stage of the expansion stroke may be the early stage when the expansion stroke is evenly divided into three stages of the early stage, an intermediate stage, and a final stage. By injecting the fuel on the intake stroke (the reference character 6051), the formation period of time of the mixture gas is sufficiently secured. Additionally, by injecting the fuel in the retard period (the reference character 6052), the gas flow inside the combustion chamber 17 is enhanced immediately before the ignition. The fuel pressure is set to a high fuel pressure of 30 MPa or above. By increasing the fuel pressure, the fuel injection period and the mixture gas formation period are shortened and the gas flow inside the combustion chamber 17 is enhanced even more. An upper limit of the fuel pressure may be, for example, 120 MPa.

After the fuel is injected, the spark plug 25 ignites the mixture gas at a timing near CTDC (the reference character 6053). The spark plug 25 may ignite after CTDC. The mixture gas causes the SI combustion on the expansion stroke. Since the SI combustion starts on the expansion stroke, the CI combustion does not start.

In order to avoid pre-ignition, the injector 6 may retard the fuel injection timing as the engine speed decreases. The fuel injection in the retard period may end on the expansion stroke.

When the engine 1 operates within the high-load low-speed range (3), the time length from the start of the fuel injection in the retard period until the ignition is short. In order to improve the ignitability of the mixture gas and to stabilize the SI combustion, the fuel needs to be promptly conveyed to near the spark plug 25.

When the injector 6 injects the fuel in the period from the final stage of the compression stroke to the early stage of the expansion stroke, since the piston 3 is located near the CTDC (not illustrated), the fuel spray flows downward along the convex section 311 of the cavity 31 while mixing with fresh air, and flows along the bottom surface and the circumferential surface of the cavity 31 to spread radially outward from the center of the combustion chamber 17. Then, the mixture gas reaches the opening of the cavity 31, flows along the inclined surface 1311 on the intake side and the inclined surface 1312 on the exhaust side, and further flows from the outer circumferential side toward the center of the combustion chamber 17.

Further, when the engine 1 operates within the high-load low-speed range (3), the swirl flow is made weaker than when operating within the high-load medium-speed range (2). When the engine 1 operates within the high-load low-speed range (3), the opening of the SCV 56 is larger than when operating within the high-load medium-speed range (2). The opening of the SCV 56 may be, for example, about 50% (i.e., half opened).

As indicated by the two-dotted chain line in the upper part of FIG. 2, the axes of the nozzle ports of the injector 6 do not circumferentially overlap with the spark plug 25. The fuel injected from the nozzle ports flows in the circumferential direction due to the swirl flow inside the combustion chamber 17. By the swirl flow, the fuel is promptly conveyed to near the spark plug 25. The fuel is vaporized while being conveyed to near the spark plug 25.

On the other hand, if the swirl flow is excessively strong, the fuel flows in the circumferential direction and travels away from the spark plug 25. For this reason, when the engine 1 operates within the high-load low-speed range (3), the swirl flow is made weaker than when operating within the high-load medium-speed range (2). As a result, the fuel is promptly conveyed to near the spark plug 25, thus the ignitability of the mixture gas improves and the SI combustion stabilizes.

Within the high-load low-speed range (3), the engine 1 performs the SI combustion by injecting the fuel in the retard period from the final stage of the compression stroke to the early stage of the expansion stroke (i.e., retarded SI). Within this range, by setting the air-fuel ratio of the mixture gas substantially to the stoichiometric air-fuel ratio, the exhaust gas discharged from the combustion chamber 17 is purified by utilizing the three-way catalysts 511 and 513. By performing the SI combustion, abnormal combustion is avoided.

(High Speed Range (4))

When the engine speed is high, the time length for the crank angle to change 1° becomes shorter. Therefore, for example, within the high speed side of the high load range, it is difficult to stratify the mixture gas in the combustion chamber 17 as described above. When the engine speed increases, it becomes difficult to perform the SPCCI combustion described above.

When the engine 1 is operating within the high speed range (4), the engine 1 performs the SI combustion instead of the SPCCI combustion. Note that, the high speed range (4) extends over the entire load direction from low load to high loads.

The reference character 606 in FIG. 9 indicates the fuel injection timing (a reference character 6061) and the ignition timing (a reference character 6062), and the combustion waveform (a reference character 6063) when the engine 1 is operating in the operating state 606 where the engine load is high within the high speed range (4) of the engine 1.

The EGR system 55 introduces the EGR gas into the combustion chamber 17 when the operating state of the engine 1 is within the high speed range (4). The engine 1 reduces the EGR gas amount as the engine load increases. At the full load, the EGR gas may be set to zero.

When operating in the high speed range (4), the engine 1 fully opens the SCV 56. No swirl flow is generated in the combustion chamber 17, and only the tumble flow is generated. By fully opening the SCV 56, the charging efficiency is improved in the high speed range (4) and a pumping loss is reduced.

When the engine 1 operates within the high speed range (4), the air-fuel ratio (A/F) of the mixture gas is basically at the stoichiometric air-fuel ratio (A/F=14.7:1) in the entire combustion chamber 17. The excess air ratio $\lambda$ of the mixture gas may be set to 1.0±0.2. Note that near the full load within the high speed range (4), the excess air ratio $\lambda$ of the mixture gas may be less than 1.

When the engine 1 operates within the high speed range (4), the injector 6 starts the fuel injection on the intake stroke. The injector 6 injects all the fuel portion for one combustion cycle in a lump (the reference character 6061). By starting the fuel injection on the intake stroke, homogeneous or substantially homogeneous mixture gas is formed in the combustion chamber 17. Further, when the engine speed is high, since the evaporation time of the fuel is secured as long as possible, the unburned fuel loss is reduced.

After the fuel injection is ended, the spark plug 25 ignites the mixture gas at a suitable timing before CTDC (the reference character 6062).

Therefore, within the high speed range (4), since the engine 1 starts the fuel injection on the intake stroke and performs the SI combustion (i.e., intake SI). Also within this range, by setting the air-fuel ratio of the mixture gas substantially to the stoichiometric air-fuel ratio, the exhaust gas discharged from the combustion chamber 17 is purified by utilizing the three-way catalysts 511 and 513. By further performing the SI combustion, abnormal combustion is avoided.

(Layer Structure of Operating Range Map)

Figure 11:
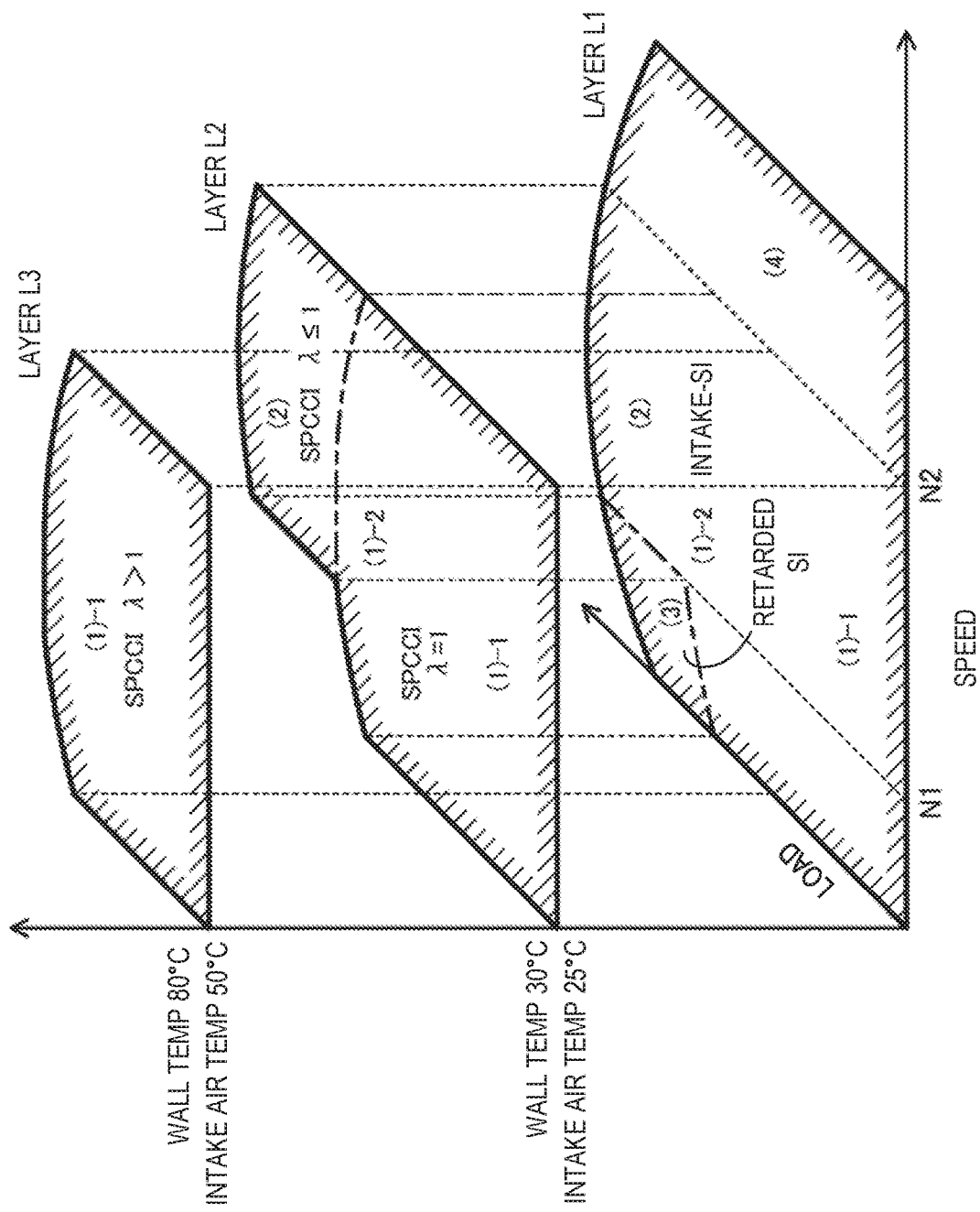
FIG. 11 is a chart illustrating a layer structure of the operating range maps of the engine.

As illustrated in FIG. 11, the operating range maps 501 and 502 of the engine 1 illustrated in FIG. 8 are formed by superimposing three layers of layer L1, layer L2, and layer L3.

The layer L1 is a foundation layer. The layer L1 spreads entirely over the operating range map. The layer L1 includes all the low load range (1)-1, the medium load range (1)-2, the high-load medium-speed range (2), the high-load low-speed range (3), and the high speed range (4).

The layer L2 is superimposed on the layer L1. The layer L2 includes the low load range (1)-1, the medium load range (1)-2 and the high-load medium-speed range (2), and not the high-load low-speed range (3) and the high speed range (4).

The layer L3 is superimposed on the layer L2. The layer L3 includes the low load range (1)-1.

One or more of the layers L1, L2, and L3 are selected according to the wall temperature of the combustion chamber 17 and the intake air temperature. Although is described later in detail, the layer selection includes three options, a case of selecting only the layer L1, a case of selecting the layers L1 and L2, and a case of selecting the layers L1, L2, and L3. The operating range map 501 of the engine 1 illustrated in FIG. 8 corresponds to the case of selecting the layers L1, L2, and L3.

In the operating range map formed by superimposing these layers L1, L2, and L3 upon selecting them, the low load range (1)-1 is applied with the layer L3 which is the top layer for this range, the medium load range (1)-2 and the high-load medium-speed range (2) are applied with the layer L2 which is the top layer for these ranges, and the other high-load low-speed range (3) and high speed range (4) are applied with the layer L1.

In the operating range map formed by superimposing the layers L1 and L2 upon selecting them, different from the case described above, the low load range (1)-1, the medium load range (1)-2 and the high-load medium-speed range (2) are applied with the layer L2 which is the top layer for these ranges, and the other high-load low-speed range (3) and high speed range (4) are applied with the layer L1.

In the operating range map formed by the layer L1 alone upon selecting it, different from the cases described above, the low load range (1)-1, the medium load range (1)-2 and the high-load medium-speed range (2), the high-load low-speed range (3), and the high speed range (4) are applied with the layer L1.

The SPCCI combustion is performed in the layer L3. Within the low load range (1)-1 of the layer L3, the air-fuel ratio of the mixture gas of the entire combustion chamber 17 is set leaner than the stoichiometric air-fuel ratio (i.e., $\lambda>1$). The layer L3 is selected when the wall temperature of the combustion chamber 17 is above a first given wall temperature (e.g., 80° C.) and the intake air temperature is above a first given intake air temperature (e.g., 50° C.). The wall temperature of the combustion chamber 17 may be substituted by, for example, the temperature of the coolant of the engine 1 detected by the water temperature sensor SW10. Further, the wall temperature of the combustion chamber 17 may be estimated based on the temperature of the coolant or other detection results. The intake air temperature is detected by, for example, the third intake air temperature sensor SW17 which detects the temperature inside the surge tank 42. Alternatively, the temperature of the intake air introduced into the combustion chamber 17 may be estimated based on various detection results.

As described with reference to FIG. 10, the SPCCI combustion is performed by generating the strong swirl flow inside the combustion chamber 17. In the SI combustion, since the flame propagates along the wall of the combustion chamber 17 flame propagation of the SI combustion receives an influence of the wall temperature. With low wall temperature, the flame of the SI combustion is cooled and the timing of the compression ignition is delayed.

As illustrated in the operating range map 501 of FIG. 8, when the engine 1 is operating within the low load range (1)-1, the air-fuel ratio of the mixture gas is leaner than the stoichiometric air-fuel ratio. In this operating state, if the timing of compression ignition is to be advanced to a target timing while the wall temperature of the combustion chamber 17 is low, it may be considered to increase the fuel injection amount for the SI combustion so as to increase the heat generation by the SI combustion. However, if the air-fuel ratio of the mixture gas in the center portion of the combustion chamber 17, which is for the SI combustion, is brought close to the stoichiometric air-fuel ratio from lean A/F between 20:1 and 30:1 as described above, the combustion temperature of the SI combustion rises and generates a large amount of raw $NO_x$. On the other hand, when the engine 1 is operating within the low load range (1)-1, since the air-fuel ratio of the mixture gas of the entire combustion chamber 17 is leaner than the stoichiometric air-fuel ratio as described above, the three-way catalysts 511 and 513 cannot purify raw $NO_x$ discharged from the combustion chamber 17.

Further, since the SPCCI combustion is the combination of the SI combustion and the CI combustion, it also receives other influences than the wall temperature of the combustion chamber 17. The CI combustion of the SPCCI combustion is performed from the outer circumferential portion to the center portion of the combustion chamber 17 after the flame propagates along the wall, therefore, it receives an influence of the temperature of the center portion of the combustion chamber 17. If the temperature of the center portion is low, the CI combustion becomes unstable. The temperature of the center portion of the combustion chamber 17 depends on the temperature of the intake air introduced into the combustion chamber 17. That is, the temperature of the center portion of the combustion chamber 17 rises when the intake air temperature is high, and it drops when the intake air temperature is low.

When the wall temperature of the combustion chamber 17 is above the first given wall temperature and the intake air temperature is above the first given intake air temperature, since the SPCCI combustion is stably performed, the layer L3 is selected. Thus, within the low load range (1)-1, the air-fuel ratio of the mixture gas is set leaner than the stoichiometric air-fuel ratio, and the SPCCI combustion is performed. By setting the air-fuel ratio of the mixture gas leaner than the stoichiometric air-fuel ratio when the engine load is low, the fuel efficiency of the engine 1 significantly improves.

The SPCCI combustion is performed in the layer L2. Within the low load range (1)-1 and the medium load range (1)-2 of the layer L2, the air-fuel ratio of the mixture gas of the entire combustion chamber 17 is set to or substantially to the stoichiometric air-fuel ratio (i.e., $\lambda=1$). Further within the high-load medium-speed range (2) of the layer L2, the air-fuel ratio of the mixture gas of the entire combustion chamber 17 is set to or richer than the stoichiometric air-fuel ratio (i.e., $\lambda \leq 1$). Within the low load range (1)-1, the medium load range (1)-2 and the high-load medium-speed range (2) of the layer L2, the EGR gas is introduced into the combustion chamber 17. The G/F of the mixture gas is set to 18 or above. The layer L2 is selected when the wall temperature of the combustion chamber 17 is above a second given wall temperature (e.g., 30° C.) and the intake air temperature is above a second given intake air temperature (e.g., 25° C.). Note that the layer L2 is also selected when the wall temperature of the combustion chamber 17 is above the first given wall temperature or the intake air temperature is above the first given intake air temperature.

As described above, when the wall temperature of the combustion chamber 17 is low and/or the intake air temperature is low, it becomes difficult to stably perform the SPCCI combustion by setting the air-fuel ratio of the mixture gas leaner than the stoichiometric air-fuel ratio.

Further, if the wall temperature of the combustion chamber 17 and/or the intake air temperature are low, even with the SPCCI combustion utilizing the heat generation in the SI combustion, it becomes difficult to stably perform the CI combustion.

Therefore, when the wall temperature of the combustion chamber 17 is below the first given wall temperature or the intake air temperature is below the first given intake air temperature while the wall temperature is above the second given wall temperature and the intake air temperature is above the second given intake air temperature, the layer L2 is selected and the layer L3 is not selected. By selecting the layer L2, when the wall temperature of the combustion chamber 17 is below the first given wall temperature or the intake air temperature is below the first given intake air temperature, within the low load range (1)-1, the SPCCI combustion in which the air-fuel ratio of the mixture gas is set to or substantially to the stoichiometric air-fuel ratio is performed. Thus, the SPCCI combustion is stabilized. Moreover, by performing the SPCCI combustion within each of the low load range (1)-1, the medium load range (1)-2, and the high-load medium-speed range (2) when the wall temperature is above the second given wall temperature and the intake air temperature is above the second given intake air temperature, the fuel efficiency of the engine 1 is improved.

Within the low load range (1)-1, the medium load range (1)-2, the high-load medium-speed range (2), and the high speed range (4) of the layer L1, the fuel injection is started on the intake stroke and the SI combustion by spark-ignition is performed (i.e., intake SI). Further within the high-load low-speed range (3) of the layer L1, the SI combustion is performed by injecting the fuel during the intake stroke and the retard period from the final stage of the compression stroke to the early stage of the expansion stroke (i.e., retarded SI). Therefore, in the layer L1, the SI combustion by spark-ignition is performed instead of the SPCCI combustion in all the operating ranges of the engine 1. The air-fuel ratio of the mixture gas is basically at or substantially at the stoichiometric air-fuel ratio. The layer L1 is always selected regardless of the wall temperature of the combustion chamber 17 and the intake air temperature.

When the wall temperature is below the second given wall temperature and the intake air temperature is below the second given intake air temperature, by performing the SI combustion in all the operating ranges, combustion stability is secured. Thus, a variation in torque between combustion cycles is reduced. Further, by setting the air-fuel ratio of the mixture gas substantially to the stoichiometric air-fuel ratio, the exhaust gas is purified by utilizing the three-way catalysts 511 and 513, and thus, a degradation of the exhaust emission performance is prevented.

As described above, the layer structure of the operating range map is based on the characteristic of the SPCCI combustion. By selecting one or more of the layers L1, L2, and L3 according to the wall temperature of the combustion chamber 17 and the intake air temperature, the fuel efficiency of the engine 1 is improved as much as possible while avoiding the degradation of the exhaust emission performance.

(Control Process of Engine)

Figure 12:
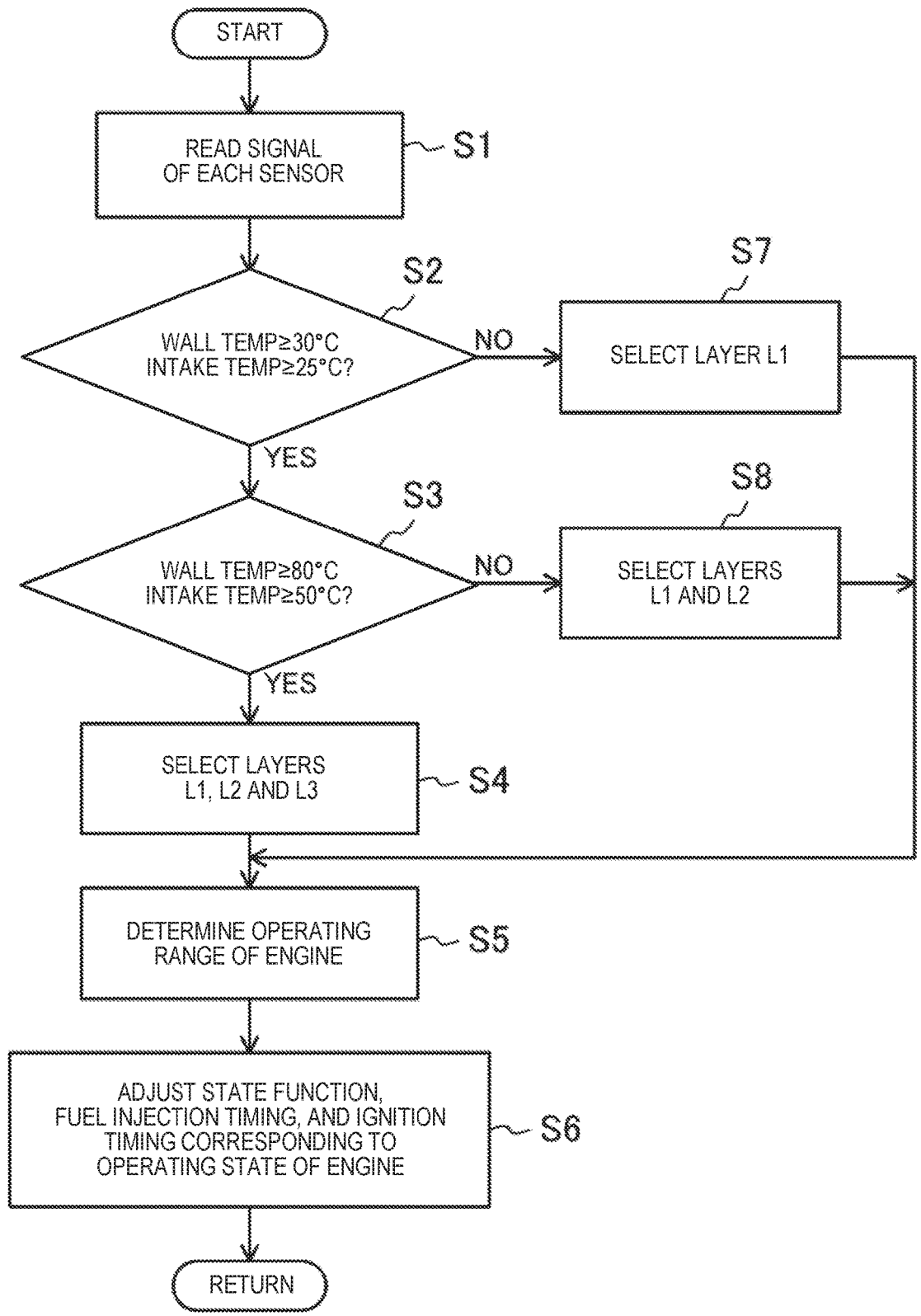
FIG. 12 is a flowchart illustrating a control process of the engine according to a layer selection of the operating range map.

Next, an operation control of the engine 1 executed by the ECU 10 will be described with reference to the flowchart of FIG. 12. This flowchart is related to the layer selection of the operating range map.

First at S1 after the start, the ECU reads the signals from the sensors SW1 to SW17. Next at S2, the ECU 10 determines whether the wall temperature of the combustion chamber 17 is 30° C. or above and the intake air temperature is 25° C. or above. If the result is positive, the process proceeds to S3, whereas if the result is negative, the process proceeds to S7. At S7, since the wall temperature of the combustion chamber 17 or the intake air temperature is excessively low, the ECU 10 only selects the layer L1. Layer L1 may be a first operating range map defining flame propagation combustion in which self-ignition does not occur from a lowest load to a highest load of the engine. Therefore, when the engine 1 operates within the low load range (1)-1, the medium load range (1)-2, the high-load medium-speed range (2), or the high speed range (4), it operates in the "intake SI" mode, and when the engine 1 operates within the high-load low-speed range (3), it operates in the "retarded SI" mode. Then the process proceeds to S5.

At S3, the ECU 10 determines whether the wall temperature of the combustion chamber 17 is 80° C. or above and the intake air temperature is 50° C. or above. In other words, the temperature determining module 104 may be configured to determine whether the temperature of the combustion chamber 17 is at or above a given temperature based on an output value of a temperature sensor configured to detect a parameter related to a temperature of the combustion chamber 17. If the result is positive, the process proceeds to S4, whereas if the result is negative, the process proceeds to S8.

At S8, the ECU 10 selects the layer L1 and the layer L2. Layer L2 may be a second operating range map defining self-ignition combustion in which the air-fuel ratio is substantially at the stoichiometric air-fuel ratio from the lowest load to the highest load of the engine. Therefore, when the engine 1 operates within the low load range (1)-1 or the medium load range (1)-2, it operates in the "SPCCI $\lambda=1$" mode, and when the engine 1 operates within the high-load medium-speed range (2), it operates in the "SPCCI $\lambda \leq 1$" mode. Moreover, when the engine 1 operates within the high speed range (4), it operates in the "intake SI" mode, and when the engine 1 operates within the high-load low-speed range (3), it operates in the "retarded SI" mode. In other words, the air-fuel ratio controlling module 105 may be configured to, when the temperature of the combustion chamber 17 is determined to be below the given temperature at an engine load, to output a control signal to the air-fuel ratio controller to set the air-fuel ratio of the mixture gas substantially to a stoichiometric air-fuel ratio and, when the temperature of the combustion chamber is determined to be above the given temperature at the engine load, to output a control signal to the air-fuel ratio controller to set the air-fuel ratio of the mixture gas leaner than the stoichiometric air-fuel ratio. Then the process proceeds to S5.

At S4, the ECU 10 selects the layer L1, the layer L2 and the layer L3. Layer L3 may be a third operating range map defining self-ignition combustion in which the air-fuel ratio is leaner than the stoichiometric air-fuel ratio from the lowest load to a given high load of the engine, and self-ignition combustion in which the air-fuel ratio is substantially at the stoichiometric air-fuel ratio from the given high load to the highest load of the engine. In other words, the operating range map selecting module 107 may be configured to select layer L1 when the combustion-chamber-wall-temperature related value is below a first low wall temperature, layer L2 when the combustion-chamber-wall-temperature related value is at or above the first low wall temperature and below a second wall temperature higher than the first low wall temperature, and layer L3 when the combustion-chamber-wall-temperature related value is at or above the second wall temperature. In alternative embodiments, the operating range map selecting module 107 may be configured to select layer L1 when the intake-air-temperature related value is below a first low intake air temperature, layer L2 when the intake-air-temperature related value is at or above the first low intake air temperature and below a second intake air temperature higher than the first low intake air temperature, and layer L3 when the intake-air-temperature related value is at or above the second intake air temperature. Therefore, when the engine 1 operates within the low load range (1)-1, it operates in the "SPCCI $\lambda>1$" mode, when the engine 1 operates within the medium load range (1)-2, it operates in the "SPCCI $\lambda=1$" mode, and when the engine 1 operates within the high-load medium-speed range (2), it operates in the "SPCCI $\lambda \leq 1$" mode. Moreover, when the engine 1 operates within the high speed range (4), it operates in the "intake SI" mode, and when the engine 1 operates within the high-load low-speed range (3), it operates in the "retarded SI" mode. In other words, at S4, the spark plug controlling module 106 may be configured to output a control signal to the spark plug 25 to perform the ignition at a given ignition timing so that the mixture gas starts combustion by flame propagation and then unburned mixture gas self-ignites, the given ignition timing being stored in an ignition timing memory 102. Then the process proceeds to S5.

At S5, the ECU 10 determines the operating state of the engine 1 based on the various detection signals acquired at S1. Next at S6, the ECU 10 operates the engine 1 by adjusting a state function (i.e., A/F and/or G/F of the mixture gas), the fuel injection timing, and the ignition timing according to the operating range map based on the layer selected at S4, S7, or S8, and the operating state of the engine 1 determined at S5.

Therefore, while the engine 1 operates within the low load range (1)-1 within which the engine load falls below a given load, when the wall temperature of the combustion chamber 17 is below the given wall temperature or the intake air temperature is below the given intake air temperature, the air-fuel ratio of the mixture gas is set substantially to the stoichiometric air-fuel ratio according to the layer L2, and when the wall temperature of the combustion chamber 17 is above the given wall temperature or the intake air temperature is above the given intake air temperature, the air-fuel ratio of the mixture gas is set leaner than the stoichiometric air-fuel ratio according to the layer L3.

Here, although the layer is selected by taking into consideration the wall temperature and the intake air temperature, it may be selected based only on the intake air temperature.

Other Embodiments

Note that the art disclosed here is not limited to the application to the engine 1 having the above configuration. The configuration of the engine 1 may adopt various configurations.

For example, the engine 1 may include a turbocharger instead of the mechanical booster 44.

Moreover, the present disclosure is not limited to the engine which performs the SPCCI combustion but is broadly applicable to engines which perform compression-ignition combustion.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
17 Combustion Chamber
23 Intake Electrically-operated S-VT (State Function Adjusting Part)
24 Exhaust Electrically-operated S-VT (State Function Adjusting Part)
25 Spark Plug (Ignitor)
43 Throttle Valve (State Function Adjusting Part)
44 Booster
49 Boosting System (State Function Adjusting Part)
511, 513 Three-way Catalyst
55 EGR System (State Function Adjusting Part)
56 Swirl Control Valve (Swirl Generating Part)
6 Injector (Fuel injector)
SW10 Water Temperature Sensor (Wall Temperature Acquiring Part)
SW17 Third Intake Air Temperature Sensor (Intake Air Temperature Acquiring Part)

What is claimed is:

1. A control system comprising:
a compression-ignition engine having a combustion chamber formed by a cylinder, a piston, and a cylinder head and configured to perform SPCCI (SPark Controlled Compression Ignition) combustion, in which spark ignition (SI) combustion and compression ignition combustion are combined;
a fuel injection valve attached to the engine;
a spark plug disposed to be oriented into the combustion chamber and configured to perform ignition;
an air-fuel ratio controller configured to adjust an air-fuel ratio of mixture gas inside the combustion chamber;
a three-way catalyst provided in an exhaust passage of the engine;
a temperature sensor configured to detect a parameter related to a temperature of the combustion chamber; and
a controller connected to the fuel injection valve, the air-fuel ratio controller, the spark plug, and the temperature sensor and configured to output a control signal to the air-fuel ratio controller upon reception of a detection signal from the temperature sensor,
wherein the controller includes:
a processor configured to execute:
a temperature determining module configured to determine whether the temperature of the combustion chamber is at or above a given temperature based on an output value of the temperature sensor;
an air-fuel ratio controlling module configured, when the temperature of the combustion chamber is determined to be below the given temperature at an engine load, to output the control signal to the air-fuel ratio controller to set the air-fuel ratio of the mixture gas to a stoichiometric air-fuel ratio and, when the temperature of the combustion chamber is determined to be above the given temperature at the engine load, to output the control signal to the air-fuel ratio controller to set the air-fuel ratio of the mixture gas leaner than the stoichiometric air-fuel ratio; and a spark plug controlling module configured to output a control signal to the spark plug to perform the ignition at a given ignition timing so that the mixture gas starts combustion by flame propagation and then unburned mixture gas self-ignites, the given ignition timing being stored in an ignition timing memory,
wherein the controller controls the spark plug to perform SPCCI combustion so as to ignite the mixture gas at a first given timing so that the ignited mixture gas starts propagating flame along a wall of the combustion chamber by a swirl flow, and then unburned mixture gas is compressed to ignite at a second given timing,
wherein the controller comprises the air-fuel ratio controller,
wherein the parameter related to the temperature of the combustion chamber is an intake-air-temperature related value,
wherein the controller has a first operating range map defining a flame propagation combustion in which self-ignition does not occur from a lowest load to a highest load of the engine, a second operating range map defining self-ignition combustion in which the air-fuel ratio is at the stoichiometric air-fuel ratio from the lowest load to the highest load of the engine, and a third operating range map defining self-ignition combustion in which the air-fuel ratio is leaner than the stoichiometric air-fuel ratio from the lowest load to a given high load of the engine, and self-ignition combustion in which the air-fuel ratio is at the stoichiometric air-fuel ratio from the given high load to the highest load of the engine, and
wherein the controller further includes an operating range map selecting module configured to select the first operating range map when the intake-air-temperature related value is below a first low intake air temperature, the second operating range map when the intake-air-temperature related value is at or above the first low intake air temperature and below a second intake air temperature higher than the first low intake air temperature, and the third operating range map when the intake-air-temperature related value is at or above the second intake air temperature.

2. The control system of claim 1, wherein the controller sets G/F as an index relating to a mass ratio between all gas and fuel inside the combustion chamber, to 18 to 50.

3. The control system of claim 1, further comprising a swirl control valve configured to generate the swirl flow inside the combustion chamber,
wherein the controller controls the swirl control valve to adjust a state inside the combustion chamber at an ignition timing to have a swirl ratio of 2 to 6.

4. The control system of claim 1, wherein the spark plug is disposed at a position of a ceiling surface of the combustion chamber, away from a center axis of the cylinder of the engine.

5. A control system comprising:
a compression-ignition engine having a combustion chamber formed by a cylinder, a piston, and a cylinder head and configured to perform SPCCI (SPark Controlled Compression Ignition) combustion, in which spark ignition (SI) combustion and compression ignition combustion are combined;
a fuel injection valve attached to the engine;
a spark plug disposed to be oriented into the combustion chamber and configured to perform ignition;

an air-fuel ratio controller configured to adjust an air-fuel ratio of mixture gas inside the combustion chamber;
a three-way catalyst provided in an exhaust passage of the engine;
a temperature sensor configured to detect a parameter related to a temperature of the combustion chamber; and
a controller connected to the fuel injection valve, the air-fuel ratio controller, the spark plug, and the temperature sensor and configured to output a control signal to the air-fuel ratio controller upon reception of a detection signal from the temperature sensor,
wherein the controller includes:
  a processor configured to execute:
    a temperature determining module configured to determine whether the temperature of the combustion chamber is at or above a given temperature based on an output value of the temperature sensor;
    an air-fuel ratio controlling module configured, when the temperature of the combustion chamber is determined to be below the given temperature at an engine load, to output the control signal to the air-fuel ratio controller to set the air-fuel ratio of the mixture gas to a stoichiometric air-fuel ratio and, when the temperature of the combustion chamber is determined to be above the given temperature at the engine load, to output the control signal to the air-fuel ratio controller to set the air-fuel ratio of the mixture gas leaner than the stoichiometric air-fuel ratio; and
    a spark plug controlling module configured to output a control signal to the spark plug to perform the ignition at a given ignition timing to perform SPCCI combustion so that the mixture gas starts combustion by flame propagation and then unburned mixture gas self-ignites, the given ignition timing being stored in an ignition timing memory, wherein the parameter related to the temperature of the combustion chamber is a combustion-chamber-wall-temperature related value,
wherein the controller has a first operating range map defining flame propagation combustion in which self-ignition does not occur from a lowest load to a highest load of the engine, a second operating range map defining self-ignition combustion in which the air-fuel ratio is at the stoichiometric air-fuel ratio from the lowest load to the highest load of the engine, and a third operating range map defining self-ignition combustion in which the air-fuel ratio is leaner than the stoichiometric air-fuel ratio from the lowest load to a given high load of the engine, and self-ignition combustion in which the air-fuel ratio is at the stoichiometric air-fuel ratio from the given high load to the highest load of the engine,
wherein the controller further includes an operating range map selecting module configured to select the first operating range map when the combustion-chamber-wall-temperature related value is below a first low wall temperature, the second operating range map when the combustion-chamber-wall-temperature related value is at or above the first low wall temperature and below a second wall temperature higher than the first low wall temperature, and the third operating range map when the combustion-chamber-wall-temperature related value is at or above the second wall temperature, and
wherein the controller comprises the air-fuel ratio controller.

6. The control system of claim 5, wherein the controller sets G/F as an index relating to a mass ratio between all gas and fuel inside the combustion chamber, to 18 to 50.

7. The control system of claim 5, wherein the controller controls a swirl control valve to adjust a state inside the combustion chamber at the given timing to have a swirl ratio of 2 to 6.

* * * * *